United States Patent [19]
Tang et al.

[11] Patent Number: 5,750,270
[45] Date of Patent: May 12, 1998

[54] MULTI-LAYER MAGNETIC RECORDING MEDIA

[75] Inventors: Xiaoxia Tang, San Jose; Ga-Lane Chen, Fremont, both of Calif.

[73] Assignee: Conner Peripherals, Inc., San Jose, Calif.

[21] Appl. No.: 385,107

[22] Filed: Feb. 7, 1995

[51] Int. Cl.$^6$ ............................................. G11B 5/66
[52] U.S. Cl. ................... 428/611; 428/635; 428/668; 428/670; 428/694 TM; 428/694 TS; 428/694 MM; 428/216; 428/336; 428/900; 428/928
[58] Field of Search .................. 428/694 TM, 694 TS, 428/694 MM, 635, 670, 611, 607, 668, 900, 928, 216, 336

[56] References Cited

U.S. PATENT DOCUMENTS

| Re. 33,949 | 6/1992 | Mallary et al. | 360/110 |
|---|---|---|---|
| 4,286,299 | 8/1981 | Shirahata et al. | 360/113 |
| 4,317,148 | 2/1982 | Chi | 360/119 |
| 4,438,066 | 3/1984 | Aboaf et al. | 420/435 |
| 4,587,176 | 5/1986 | Carcia | 428/611 |
| 4,589,041 | 5/1986 | Voegeli | 360/113 |
| 4,632,883 | 12/1986 | Howard et al. | 428/611 |
| 4,639,811 | 1/1987 | Diepers et al. | 360/125 |
| 4,642,709 | 2/1987 | Vinal | 360/77 |
| 4,654,276 | 3/1987 | Ahlert et al. | 428/641 |
| 4,677,032 | 6/1987 | Robinson | 428/611 |

(List continued on next page.)

FOREIGN PATENT DOCUMENTS

| 216610A2 | 4/1987 | European Pat. Off. . | |
|---|---|---|---|
| 0 241 080 | 10/1987 | European Pat. Off. | G11B 5/66 |
| 403076A2 | 12/1990 | European Pat. Off. . | |
| 459411A2 | 12/1991 | European Pat. Off. . | |
| 459413A2 | 12/1991 | European Pat. Off. . | |
| 61-199233 | 9/1986 | Japan . | |

OTHER PUBLICATIONS

Maeno, Y., et al., *Magnetic properties of multiple-structure multilayered Co/Pd films*, Applied Physics Letters, 60 (1992) 27 Jan., No. 4, pp. 510–511.

Luykx et al., "Ferromagnetic Resonance Experiments on Co/Pd, Co/Wi, and Fe/Pd Multilayers" in J. de Physique, Dec. 1988, pp. 1769–1770.

*Primary Examiner*—Stevan A. Resan
*Attorney, Agent, or Firm*—Fliesler Dubb Meyer & Lovejoy

[57] ABSTRACT

The present invention relates to improved multi-layer magnetic recording media and magnetoresistive drive systems incorporating the same. In particular, multi-layer media including alternating layers of cobalt or cobalt alloys and a precious metal, such as palladium or platinum, and a process to manufacture such media, are disclosed. Media in accordance with the invention generally include a substrate, a nucleating layer, a lattice, and a protective layer. In certain embodiments, the substrate is polished aluminum. In other embodiments, the thickness of the nucleating layer is thicker than 100 Å, and in certain embodiments between about 200 and about 600 Å. The lattice, generally includes bilayers of cobalt (or an alloy thereof) and palladium or platinum. The thickness of the cobalt layers are between about 1.5 Å and 10 Å, or between about 2 Å and 7 Å, or between about 3 Å and 5 Å. The thickness of the palladium or platinum layers are between about 5 Å and 15 Å, or between about 7 Å and 12 Å, or between about 8 Å and 11 Å. The number of layers in the lattice 33, or its periodicity, is between about 10 and 30 or between about 15 and 25. In certain embodiments, the thickness of the lattice 33 and the nucleating layer 32 do not exceed 1500 Å.

The invention also provides a novel information storage device that includes a ring write head and a magnetoresistive (MR) read head in combination with a vertical recording media with perpendicular anisotropy exceeding $2\times10^6$ erg/cc and coercivity as high as 5000 Oe. Also provided is an improved MR read head. The improvement includes a physical offset in the MR element, such that the element is offset from perpendicular to the media.

27 Claims, 27 Drawing Sheets

U.S. PATENT DOCUMENTS

| | | | |
|---|---|---|---|
| 4,678,721 | 7/1987 | den Broeder et al. | 428/607 |
| 4,749,628 | 6/1988 | Ahlert | 428/660 |
| 4,789,606 | 12/1988 | Yamada et al. | 428/694 |
| 4,799,115 | 1/1989 | Rogers et al. | 360/66 |
| 4,816,947 | 3/1989 | Vinal et al. | 360/113 |
| 4,865,878 | 9/1989 | Nagao et al. | 427/131 |
| 4,878,140 | 10/1989 | Gill et al. | 360/113 |
| 4,897,749 | 1/1990 | Perlov et al. | 360/126 |
| 4,902,583 | 2/1990 | Brucker et al. | 428/665 |
| 5,073,836 | 12/1991 | Gill et al. | 360/113 |
| 5,106,703 | 4/1992 | Carcia | 428/635 |
| 5,227,212 | 7/1993 | Ahlert et al. | 360/97.01 |

M-H loop for 1000A CoCrTa vertical media.
Hc = 1669, Mrt = 1.6 memu/cm 2, squareness = 0.39

M-H loop for (Co/Pd)20/Pd vertical MR media
Hc = 5038, Mrt = 0.7 memu/cm 2, squareness = 0.83

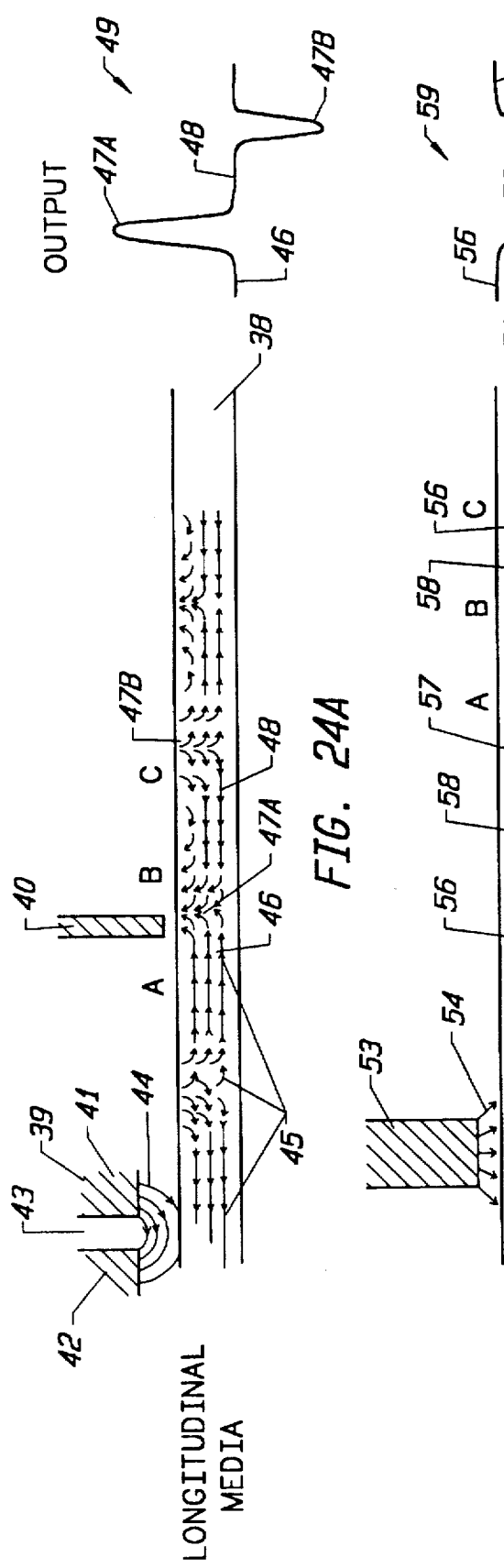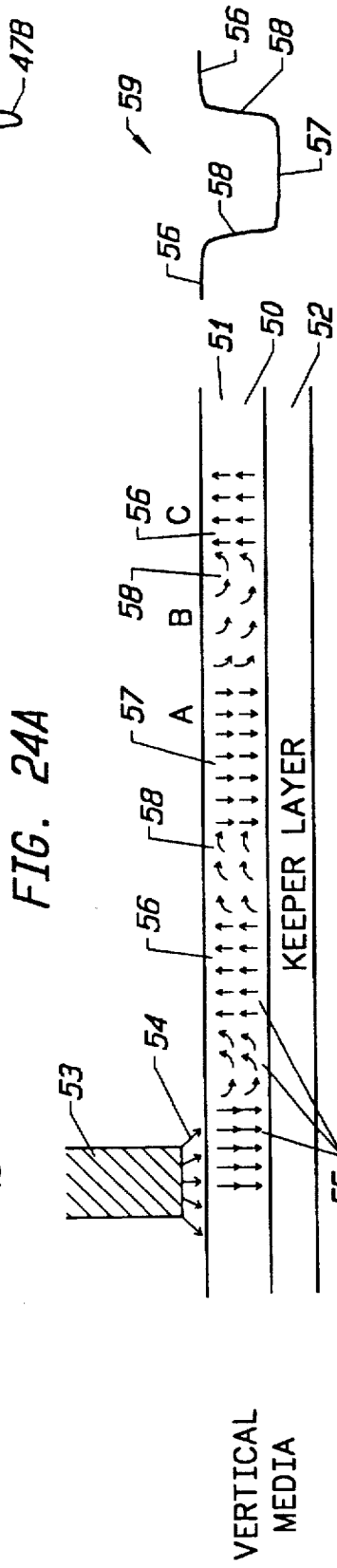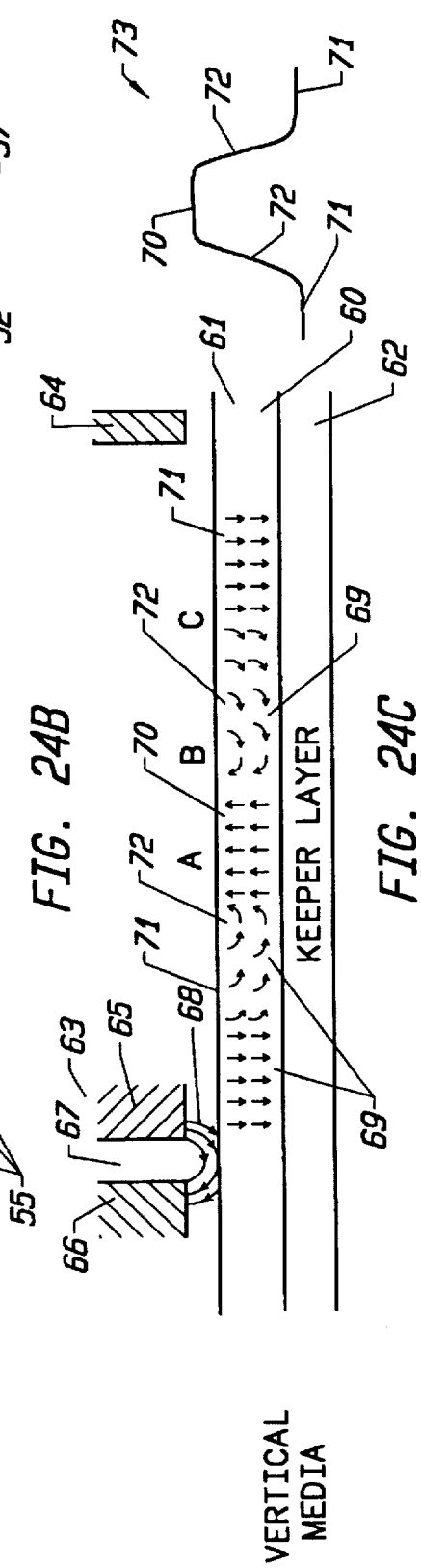

MULTI-LAYER MAGNETIC RECORDING MEDIA

FIELD OF THE INVENTION

The present invention relates to improved multi-layer magnetic recording media and magnetoresistive drive systems incorporating the same. In particular, multi-layer media including alternating layers of cobalt or cobalt alloys and a precious metal, such as palladium or platinum, are disclosed.

BACKGROUND OF THE INVENTION

Magnetic recording media is similar to the material that a tape for a tape recorder or VCR uses. Information (music, words, and pictures) can be recorded and played back. However, unlike a tape in most tape recorders and VCR's, the media of the invention is generally used to record information in a digital form. Digital information is basically strings of ones and zeros that can be decoded in a similar manner as the dots and dashes of Morse code. This digital information can be used by a computer (such as in a disk drive) or other machines to process information.

Recording media in general comprises a magnetic layer that is attached to a support layer. The magnetic layer can be thought of as having many minute crystals, with each of the crystals acting like a separate magnet. Magnets have North and South poles. One can feel the way that the North pole of one magnet pulls on the South pole of another magnet or the way that the North pole of one magnet will repel a North pole of another magnet.

Through applying an electronic charge to a crystal, one can force the crystal to change its direction of magnetization, for example, North to South or South to North. Thus, through controlled application of electronic charges to a magnetic recording media one can give the media a "magnetic texture." The texture is generally "written" onto the media with a "write head." The write head passes electricity through the media to force the crystals to change its direction of magnetization.

So, for example, assume that we start with a media that has all of its crystals aligned looking to the South. And, assume that when we pass electricity through the media, that we can cause crystals to flip to look to the North. Finally, let us assume that South facing crystals represent a 0 and North facing crystals represent 1's. We can make a "texture" on the media of:

1 1 0 1 0 0 0 1 by passing electricity through two crystals, stopping the electricity for one crystal, passing for one, stopping for three, and passing for one.

As the media moves under the read head, the read head feels the direction of magnetization and tells whatever machine it is connected to what it is feeling. What the read head feels is referred to as "flux," similar to a puff of air as an object passes by.

Conventional recording media generally places the magnetic texture within the plane of magnetic layer (longitudinal recording media) so that the direction of magnetization of the crystals can generally be described as either right or left. Newer recording media generally places the texture vertically in the media so that crystals either look up or look down (vertical recording media). It turns out that one can get more information recorded on, and read from, vertical media.

Almost all currently available magnetic recording systems, however, utilize longitudinal recording. In longitudinal recording, information is stored in magnetic media parallel to the surface of the media. In perpendicular or vertical recording, in contrast to longitudinal recording, magnetic flux travels across, or perpendicularly through, the medium, from surface to surface, instead of parallel to the surface of the media.

In theory, perpendicular media is capable of considerably higher linear data density. Generally, this possibility stems from the fact that information is stored in perpendicular media in discrete domains having opposite magnetization to the magnetization found in the surrounding areas. Such domains can potentially reside in a very small number of crystals in the media. Typically the information is read from the media through use of a magnetic head that converts local discontinuities present in the discrete domains of perpendicular magnetization into electrical fields which can then be processed as information.

However, between the discrete domains of magnetization, magnetization parallel to the surface of the media, or sub-domains or opposite magnetization, are usually present. This is particularly true in situations where remanent magnetization of a layer is significantly smaller than the saturation magnetization of the media. In such situations, the transitions between the domains can cause undesirable electronic signals stemming from, essentially, magnetic noise.

Several terms that are important in describing magnetic recording media are coercivity, anisotropy, output, and noise. Coercivity essentially refers to how firmly the media holds a particular orientation of magnetization. For example, how much energy is required to cause a crystal in the media to change orientation. Anisotropy refers to the difference in energy that is required to cause the crystals to look one direction or the other. The crystals generally have a preferred direction of magnetization so that it takes more energy to make the crystal flip from that orientation to another and less to return to the preferred orientation. Output basically refers to easy the flux is to read in the media. And, finally, noise is similar to static on the radio. If there is alot of static it is difficult to tell what song is being played.

In order to undertake perpendicular recording, it is necessary to utilize a magnetic recording media having perpendicular anisotropy. Perpendicular anisotropy is essentially due to a crystal structure of the magnetic material which creates a magnetic moment perpendicular to the surface of the media. One typical perpendicular magnetic material is the alloy cobalt-chromium (CoCr).

The degree of anisotropy of CoCr alloys varies with the amount of Chromium in the alloy. As Chromium content is increased, anisotropy decreases. Magnetic hysteresis (M-H) also decreases. For example, a typical M-H loop (which measures anisotropy) for CoCr media exhibits squareness in the perpendicular direction of only about 0.3 to 0.4, which is far below the ideal value of unity. Further, relatively thick films must be utilized to achieve sufficient perpendicular coercivities. For example the film thickness must be on the order of 500 Å to achieve a perpendicular anisotropy of 1000 Oersteds (Oe).

Multi-layer media including alternating layers of Cobalt and Palladium or Platinum have been proposed in the art as having good perpendicular recording ability. For example, in each of U.S. Pat. Nos. 4,587,176 to Carcia ("Carcia I"), 4,678,721 to den Broeder et al., and 5,106,703 to Carcia (Carcia II), multi-layer media including alternating layers of Cobalt and Palladium or Platinum are disclosed.

The Carcia I patent relates to layered coherent structures having alternating layers of cobalt and palladium or platinum. Each layer of cobalt is disclosed to be less than 8 Å (more preferably less than 7 Å, and most preferably less than 5 Å) in thickness. The thickness of each of the platinum or palladium layers is greater than 0.65 λ (more preferably 0.80 λ, and most preferably 0.90 λ) in thickness, where λ is a function of the periodicity equal to the two adjacent layers of cobalt and platinum/palladium. Values for λ are preferably less than 100 Å. The total thickness of the layered media is preferably 3,000 Å to 20,000 Å. The reference discloses that media prepared with such alternating layers exhibit enhanced perpendicular magnetic anisotropy.

The den Broeder et al. patent relates to a magnetic recording medium comprising a substrate of a non-magnetic material having a thin magnetic layer with perpendicular anisotropy. The magnetic layer comprises alternating layers of palladium and cobalt. The thicknesses of the individual layers of palladium are between 0.2 and 2.0 nm and the individual layers of cobalt include at least one monolayer of cobalt atoms and have thicknesses which are smaller than 0.3 nm. For example, the patent discloses the preparation of media including a 20 nm Pd layer, (n) layers of (x) nm Co, and (n) layers of (y) nm Pd, wherein n=150, 200, 250, and 300, x=0.2, and y=1.80–0.45. Additionally, a soft magnetic layer (i.e., permalloy) may be applied as an underlayer.

The Carcia II patent relates to an improved process for making a platinum/cobalt multilayer films which includes alternating layers of platinum and cobalt. In the improvement, krypton, xenon, or a mixture thereof is used as the sputter gas. Preferably, the cobalt layers each have like thicknesses to one another and each of the platinum layers have like thicknesses to the other platinum layers. For example, preferred thicknesses of the cobalt layers are of 12 Å (1.2 nm) or less (most preferably 2–5 Å (0.2–0.5 nm) and preferred thicknesses of the platinum layers are 24 Å (2.4 nm) or less (most preferably, $d_{Pt}/d_{Co}$ is about 1 to 5) with a total thickness of the multilayer being about 750 Å (75 nm) or less. In the examples, samples are prepared having 5, 10, 15, 20, 25 and 40 bilayers of platinum and cobalt. Further, it appears as though higher sputter pressures may be used. The films prepared in accordance with the patent are disclosed to have high coercivities and high degrees of anisotropy.

In spite of the disclosures in each of the above-referenced patents, the coercivities, outputs, and noise levels exhibited by the media disclosed therein are not exceptional. As will be appreciated, each of coercivity, output, and noise level impact the absolute data density that can be accommodated by, and resolved from, magnetic recording media. Accordingly, it would be desirable to provide multi-layer magnetic recording media having enhanced coercivities and outputs with an attendant reduction in noise levels.

SUMMARY OF THE INVENTION

The basic invention that unexpectedly allows us to manufacture vertical recording media with enhanced outputs and reduced noise levels is an improved multi-layer magnetic recording media that offers far higher coercivities, improved outputs, and reduced noise levels over the prior art. The media is a multi-layer or superlattice of Cobalt or an alloy of Cobalt and a precious metal, such as Palladium or Platinum. Particularly preferred media include Cobalt and Palladium layers, atop a nucleating layer of Palladium, all atop a soft magnetic (keeper) (i.e., permalloy) layer.

In addition, we have discovered that it is possible to precisely control the noise levels of the media through utilization of certain process conditions. For example, utilization of a low vacuum base pressure and a high sputtering pressure, media noise can be reduced. Also, the inclusion of Oxygen in the sputter gas, can reduce media noise. Further, annealing of the media and/or keeper layer can be used to control media noise. Adjusting the number of layers within the lattice can also impact media noise. Media noise can be further controlled by doping the cobalt layers to form an alloy, such as with chromium and/or tantalum. Finally, either the crystal structure of the media and/or the read head can be manufactured with a physical offset.

In another aspect of the invention, we have also discovered a new head design for use with media in accordance with the invention. The head design essentially includes a conventional ring head, for writing to the media, in combination with a magnetoresistive (MR) read head. To achieve a reduction in media noise, the MR head can be constructed with a physical offset, to offset the sensitivity of the MR element from directly perpendicular to the media.

In combination, the above inventive features will permit us to build a single disk drive that will approach three giga-bits of actual linear data density. This result represents a tremendous improvement over magnetic recording media of the prior art.

Through use of the media of the present invention, we have produced vertical magnetic recording media having coercivities exceeding 1800 Oe, 2500 Oe and even exceeding 5000 Oe. The media of the present invention demonstrate high coercivities, sharp switch field distribution, and high squareness ratio. Thus, the media in accordance with the invention is ideally suited for ultra high density recording. For example, in M-H loop studies, the media of the present invention demonstrate exceptional squareness of 0.8–0.9 to unity. Further, the Mrt of media in accordance with the invention can be adjusted from 0.5 to 1.5 memu/cm$^2$ through changing the number of multi-layers present within the lattice. However, beneficially, in changing the number of multi-layers to adjust the Mrt, little change in coercivity is observed. Finally, media in accordance with the invention generally exhibit 30% sharp transition, higher output, and higher data densities.

In accordance with one aspect of the present invention, there is provided a magnetic recording medium, comprising: a substrate having deposited thereon a nucleating layer of a nonmagnetic metal selected from the group consisting of palladium or platinum having a thickness of greater than 50 Å and a recording layer comprising a plurality of bilayers of a magnetic metal, or an alloy thereof, having perpendicular magnetic anisotropy and having a first thickness and a nonmagnetic metal selected from the group consisting of palladium or platinum having a second thickness.

Generally, the first thickness is between about 1.5 Å and 10 Å. The second thickness is generally between about 5 Å and 15 Å. The thickness of the nucleating layer is generally between about 200 Å and about 600 Å. The number of bilayers is generally between about 10 and 30. Generally, the nucleating layer and the recording layer have a total thickness that does not exceed 1500 Å. In general, the coercivity of the media that exceeds about 1800 Oersteds. In certain embodiments, the medium further comprises a keeper layer disposed between the nucleating layer and the substrate. The keeper layer may be formed from an NiFe alloy. Generally, the keeper layer has a thickness of between about 2 μm and about 6 μm.

In accordance with a second aspect of the present invention, there is provided a magnetic recording medium, comprising: a substrate having deposited thereon a nucleating layer of a nonmagnetic metal selected from the group consisting of palladium or platinum having a thickness of greater than 50 Å and a recording layer comprising a plurality of bilayers of cobalt, or an alloy thereof, having a first thickness and a nonmagnetic metal selected from the group consisting of palladium or platinum having a second thickness, characterized in that the first thickness is between about 1.5 Å and 10 Å, the second thickness is between about 5 Å and 15 Å, the number of bilayers is between about 10 and 30, a thickness of the nucleating layer and the recording layer that does not exceed 1500 Å, and a coercivity of the medium that exceeds about 1800 Oersteds.

In accordance with a third aspect of the present invention, there is provided a process to manufacture a magnetic recording medium, comprising: providing a substrate, vacuum depositing on the substrate a nucleating layer selected from the group consisting of palladium and platinum to a thickness of greater than about 50 Å, and vacuum depositing on the nucleating layer a recording layer, the recording layer comprising a plurality of bilayers of cobalt, or an alloy thereof, having a first thickness and a nonmagnetic metal selected from the group consisting of palladium or platinum having a second thickness.

In one embodiment, the process further comprises the step of: annealing the medium after the step of depositing the nucleating layer in the presence of oxygen. In another embodiment, the process further comprises the step of: vacuum depositing on the substrate a keeper layer prior to depositing the nucleating layer. In another embodiment, the process further comprises the step of: annealing the medium with the keeper layer, prior to depositing the nucleating layer, in the presence of oxygen. In another embodiment, the step of depositing the recording layer is accomplished in the presence of oxygen.

In accordance with a fourth aspect of the present invention, there is provided an information storage device, comprising: a planar magnetic recording medium having perpendicular magnetic anisotropy, Ku, that is greater than or equal to $2 \times 10^6$ erg/cc for receiving, storing, and allowing the reading of information in the form of magnetic flux, a read/write head for writing information in the form of magnetic flux to, and reading information in the form of magnetic flux from, the medium, the head comprising a ring-type write element and a magnetoresistive (MR) read element.

In one embodiment, the magnetic recording medium further comprises: a substrate having deposited thereon a nucleating layer of a nonmagnetic metal selected from the group consisting of palladium or platinum having a thickness of greater than 50 Å and a recording layer comprising a plurality of bilayers of cobalt, or an alloy thereof, having a first thickness and a nonmagnetic metal selected from the group consisting of palladium or platinum having a second thickness, characterized in that the first thickness is between about 1.5 Å and 10 Å, the second thickness is between about 5 Å and 15 Å, the number of bilayers is between about 10 and 30, and a thickness of the nucleating layer and the recording layer that does not exceed 1500 Å.

In one embodiment, the MR element is physically offset at an angle of from about −10° to 10° relative to a line extending perpendicular to the plane of the medium. In another embodiment, the magnetic read-write head of the type comprising a ring head for writing magnetic information to a magnetic recording media and a magnetoresistive read (MR) head for reading magnetic information from the magnetic recording medium, the MR head comprising a MR element disposed in the head in a perpendicular orientation relative to the magnetic recording medium, the improvement comprising: providing a physical offset to the MR element so that the element is offset from the perpendicular orientation relative to the magnetic with respect to the magnetic recording medium by an angle of between about −10° and 10°.

BRIEF DESCRIPTION OF THE DRAWING FIGURES

FIG. 24 is a comparison of recording/reading strategies with various recording media. FIG. 24a is an example of a conventional strategy of recording/reading on longitudinal recording medium utilizing a ring write head and an MR strip read head. FIG. 24b is an example of a conventional strategy of recording/reading on vertical recording medium utilizing a single pole read and write head. FIG. 24c is an example the strategy for reading and writing on the vertical recording medium in accordance with the present invention utilizing a ring write head and an MR strip read head.

Figure 25:
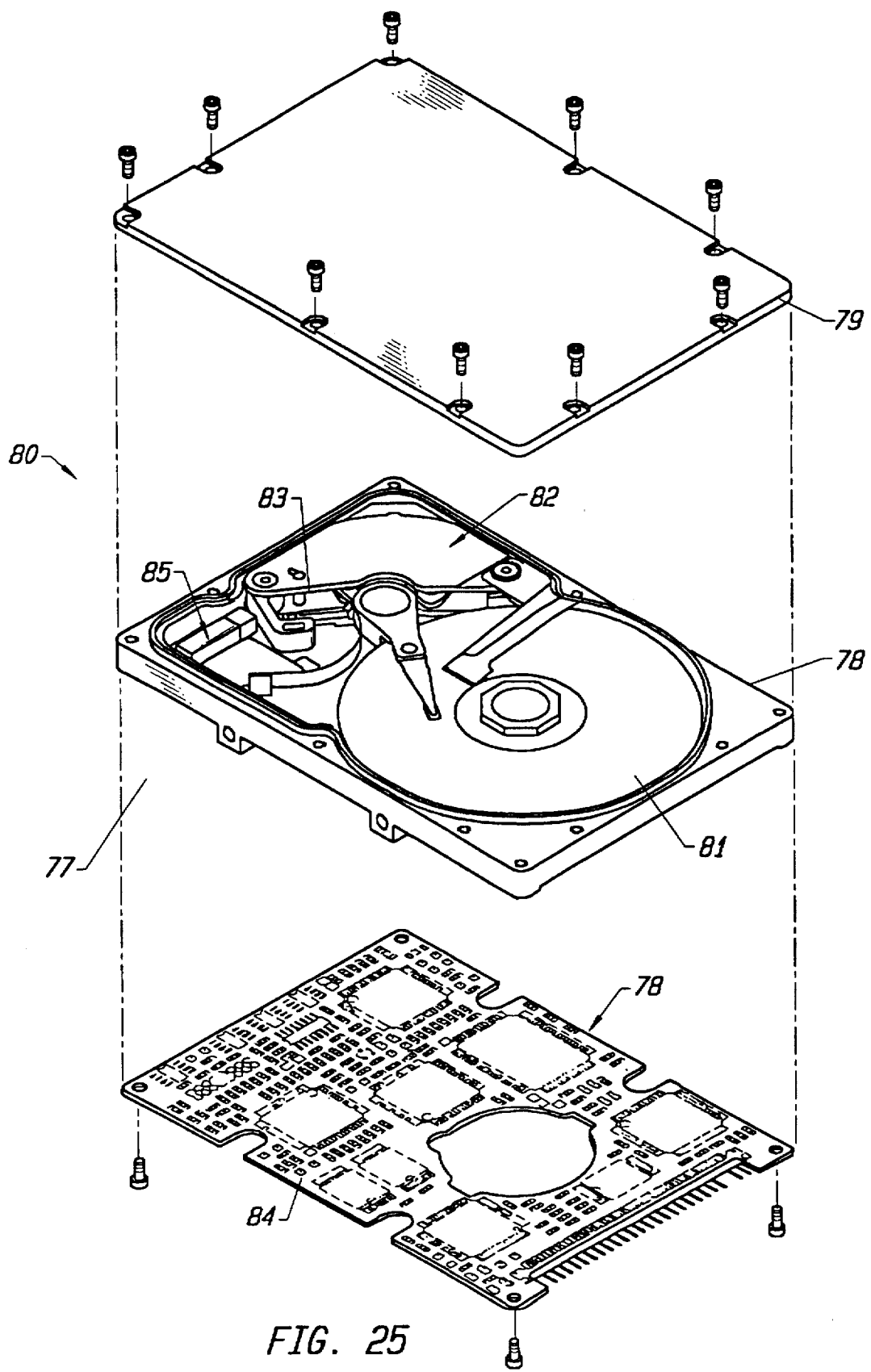

FIG. 25 is a top perspective view of a disk drive assembled with media in accordance with the invention.

Figure 26:
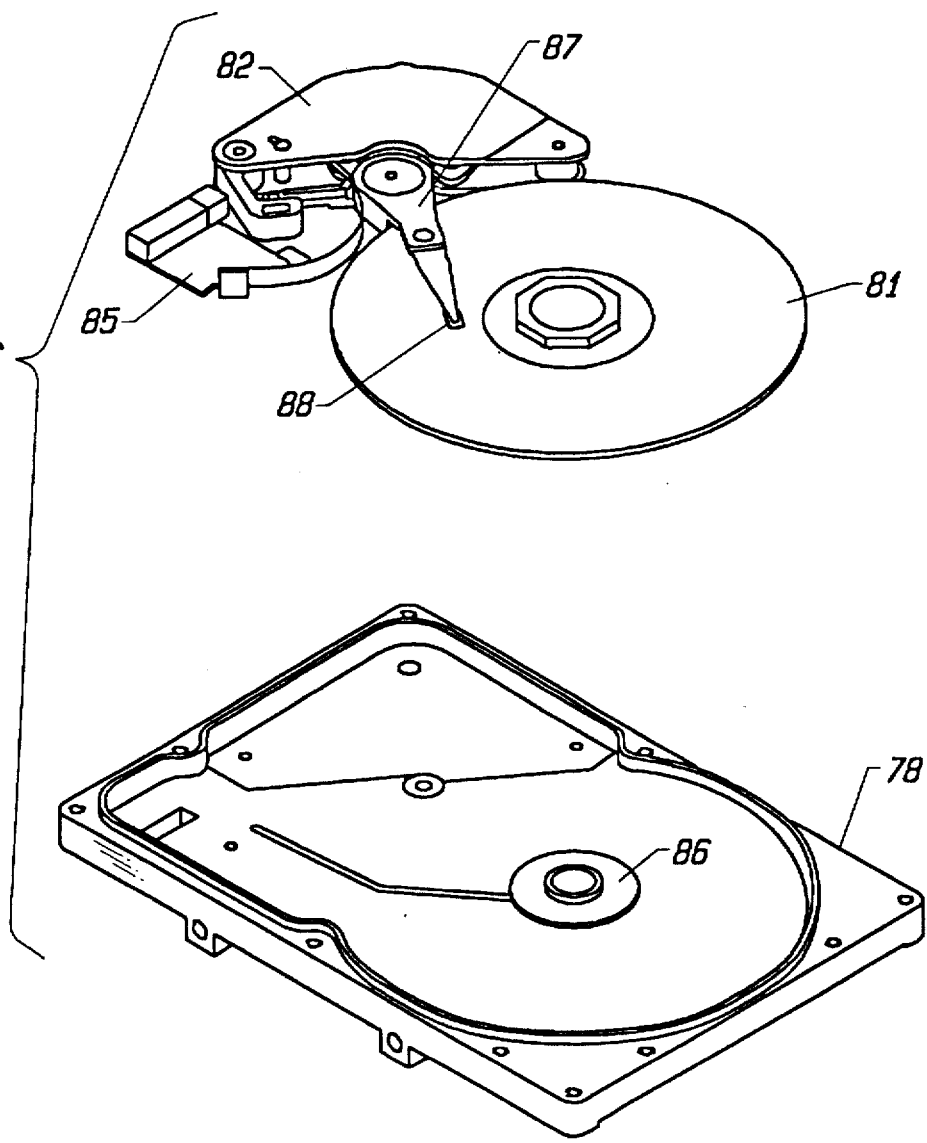

FIG. 26 is an exploded view of the disk drive shown in FIG. 25.

DETAILED DESCRIPTION OF THE INVENTION

We have unexpectedly discovered an improved multi-layer magnetic recording media that offers far higher coercivities, improved outputs, and reduced noise levels over the prior art. The basic media is a multi-layer or superlattice of Cobalt or an alloy of Cobalt and a precious metal, such as Palladium or Platinum. Particularly preferred media include Cobalt and Palladium layers, atop a nucleating layer of Palladium, all atop a soft magnetic (keeper) (i.e., permalloy) layer.

In addition, we have discovered that it is possible to precisely control the noise levels of the media through utilization of certain process conditions. For example, utilization of a low vacuum base pressure and a high sputtering pressure, media noise can be reduced. Also, the inclusion of Oxygen in the sputter gas, can reduce media noise. Further, annealing of the media and/or keeper layer can be used to control media noise. Adjusting the number of layers within the lattice can also impact media noise. Media noise can be further controlled by doping the cobalt layers to form an alloy, such as with chromium and/or tantalum. Finally, either the crystal structure of the media and/or the read head can be manufactured with a physical offset.

In another aspect of the invention, we have also discovered a new head design for use with media in accordance with the invention. The head design essentially comprises a conventional ring head, for writing to the media, in combination with a MR read head. To achieve a reduction in media noise, the MR head can be constructed with a physical offset, to offset the sensitivity of the MR element from directly perpendicular to the media.

In combination, the above inventive features will permit us to build a single disk drive that will approach three giga-bits of actual linear data density. This result represents a tremendous improvement over magnetic recording media of the prior art.

Through use of the media of the present invention, we have produced vertical magnetic recording media having coercivities exceeding 1800 Oe, 2500 Oe and even exceeding 5000 Oe. The media of the present invention demonstrate high coercivities, sharp switch field distribution, and high squareness ratio. Thus, the media in accordance with the invention is ideally suited for ultra high density recording. For example, in M-H loop studies, the media of the present invention demonstrate exceptional squareness of 0.8–0.9 to unity. Further, the Mrt (remanant magnetic moment×magnetic film thickness) of media in accordance with the invention can be adjusted from 0.5 to 1.5 memu/cm$^2$ through changing the number of multi-layers present within the lattice. However, beneficially, in changing the number of multi-layers to adjust the Mrt, little change in coercivity is observed. Finally, media in accordance with the invention generally exhibit 30% sharp transition, higher output, and higher data densities.

Media In Accordance With The Invention

Figure 1:
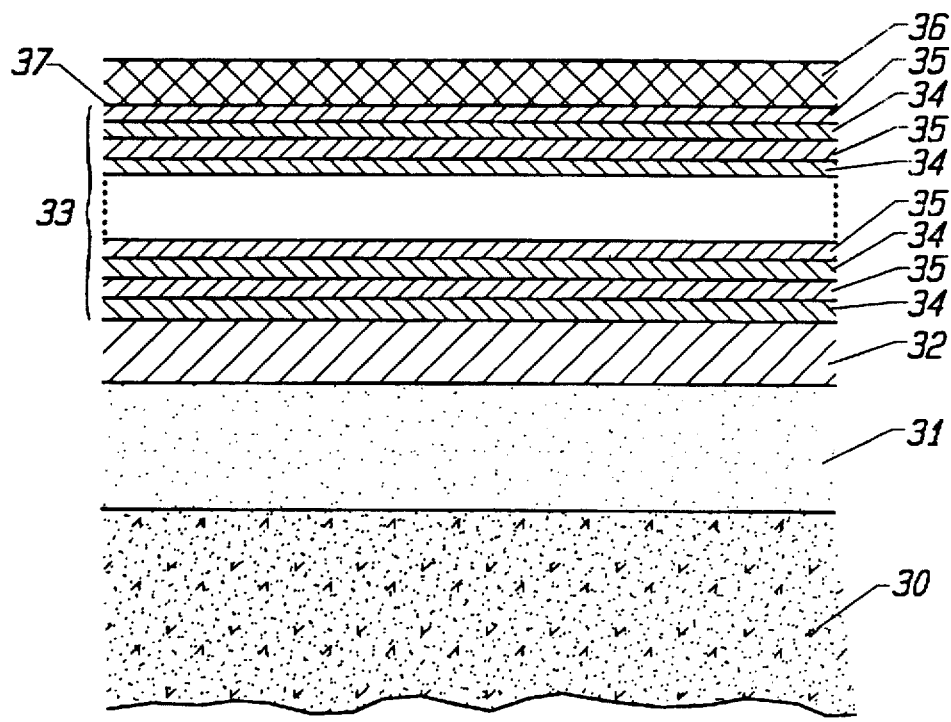
FIG. 1 is a cross-sectional schematic diagram of a multilayer media structure in accordance with the invention.

One embodiment of medium in accordance with the invention is shown schematically in FIG. 1, which is a cross-sectional view of the media. As mentioned above, media in accordance with the invention generally include a multi-layer or superlattice 33 of a perpendicular magnetic material 34, such as Cobalt or an alloy of Cobalt and a nonmagnetic material 35, preferably comprising a precious metal, such as Palladium or Platinum on a substrate 30. Other media in accordance with the invention include a soft magnetic material or keeper layer 31. In other embodiments, media in accordance with the invention also include a nucleating layer 32. In one embodiment, the lattice 33 includes Cobalt and Palladium layers, atop a nucleating layer 32 of Palladium, all atop a soft magnetic (keeper) layer 31.

In the Figure, the media is formed on a substrate 30. In some embodiments, the substrate 30 is rigid and can be formed from any conventional substrate material, such as metals, silicone based materials, and rigid polymers. For example, substrates in accordance with the invention can include aluminum, nickel-phosphorus-plated aluminum, quartz, glass, ceramic, silicone, silicone carbide, carbon, and the like. Alternatively, the substrate 30 may be relatively flexible and formed from materials such as polyester or polyimide films, and the like. The substrate 30 may require cleaning or other treatments to enhance adhesion of the subsequently deposited layer. In addition, surface treatments such as texturizing or polishing are known to promote a desired crystalline morphology in the subsequently deposited magnetic recording layer. Alternatively, the substrate 30 may be a tape suitable for conventional magnetic tape recording, e.g., polyvinylidene chloride, or a sheet of thermoplastic material, such as polyethyleneterephthalate, suitable for use in conventional floppy disks. Other surface treatments may be employed to prepare the latter substrates for subsequent deposition.

In one embodiment, a layer of a soft magnetic material 31 is deposited on the substrate 30. The soft magnetic layer 31 is sometimes referred to herein as a keeper layer 31. The keeper layer 31 may be formed from a variety of soft magnetic materials. For example, in one embodiment, the keeper layer 31 comprises a permalloy (Nickel-Iron (NiFe)) film. In addition to the utilization of NiFe as the keeper layer 31, a multitude of other soft magnetic materials may be equally effective. Examples of additional soft magnetic layers include NiFeMo, NiFeMoCu, and other soft alloys such as Fe, FeAlSi, FeNiO, FeN$_x$, FeTi, FeSiB, FeBC, FeAl, CoVFe, CoTa, CoZr, CoNbZr, CoTi, CoNbTa, CoNiZr, FeNiP, NiFeMo, NiFeCuMo and FeCoZr.

In general, the soft magnetic keeper layer 31 is plated or sputtered onto the substrate 30 using conventional plating and sputtering techniques. The keeper layer 31 is typically deposited to a depth of between about 0.1 and about 20 µm, or between about 1 and about 10 µm, and in some embodiments to a thickness of between about 2 and about 6 µm.

Next, in certain embodiments, a nucleating layer 32 of a nonmagnetic material is deposited on the keeper layer 31. The nucleating layer 32 may be formed from a precious metal, such as palladium or platinum. While other metals might also be useful (i.e., copper, zinc, cadmium, mercury alloys, silver, and gold), palladium and platinum are currently preferred. The choice of the precious metal for use in the nucleating layer 32 is generally made according to the metals used in the lattice described below.

Again, the nucleating layer 32 is typically sputtered onto the soft magnetic layer 31 using conventional techniques. The nucleating layer 32 is typically deposited to a depth of between about 30 and about 1000 Å, or between about 100 and about 500 Å, and in some embodiments to a depth of between about 250 and about 500 Å.

Atop the nucleating layer 32 in one embodiment, a superlattice 33 of alternating magnetic 34 and nonmagnetic 35 layers is deposited. In certain embodiments, the magnetic layers 34 comprise cobalt or a cobalt alloy. If the magnetic layers 34 are formed from a cobalt alloy, the alloy is generally selected so as to have sufficient perpendicular magnetic anisotropy and coercivity to the resulting media. For example, the coercivity in the vertical direction is often between about 1500 and about 6000 Oe. In certain embodiments, substantially pure cobalt is used to form the magnetic layers 34. In other embodiments alloys of cobalt, such as cobalt-chromium and cobalt-chromium-tantalum alloys. Media prepared with such alloys operate successfully in the present invention.

We have found that coercivity of the media tends to decrease where the magnetic layers 34 are structured to include a cobalt alloy. At the same time, the output of the media appears to decrease. However, beneficially, the noise of the media decreases and the signal-to-noise ratio of the media increases.

In certain embodiments, the magnetic layers 34 in the lattice 32 are deposited to a thickness of between about 1.5 Å and 10 Å, or between about 2 Å and 7 Å, and in certain embodiments to a thickness of between about 3 Å and 5 Å.

In certain embodiments, the nonmagnetic layers 35 include a precious metal, such as palladium or platinum. While other metals might also be useful (i.e., copper, zinc, cadmium, mercury alloys, silver, and gold), palladium and platinum are currently preferred. The choice of the precious metal for use in the nonmagnetic layer 35 is generally made according to the metal used in the nucleating layer 32, described above. However, as will be appreciated, mixtures of precious metals may be used in media in accordance with the invention. For example, the nucleating layer 32 could be fabricated from palladium and the nonmagnetic layers 35 could be fabricated from platinum, or vice versa. In addition, the nonmagnetic layers 35 can also be prepared from alternating metals, i.e., layers of platinum and palladium (or other appropriate metals).

The nonmagnetic layers 35 are generally deposited to a thickness of between about 5 Å and 15 Å, or between about 7 Å and 12 Å, and in certain embodiments to a thickness of between about 8 Å and 11 Å.

The number of pairs of layers (bilayers) of magnetic layers 34 and nonmagnetic layers 35 (or periodicity) is generally between about 10 and 40 or between about 15 and 25. Thus, there are generally between about 20 and 50 total layers making up the lattice 33.

The lattice 33 can be sputtered using conventional techniques. For example, the alternating layers can be accomplished on a rotating table so that the media is exposed to consecutive sputters of the magnetic layer 34 and the nonmagnetic layer 35. The motion of the table can be controlled to provide a pause during the sputtering process so as to allow the deposition of thicker or thinner layers. In addition, the table can be paused between the deposition of each layer so as to limit the possibility of cross contamination. Alternatively, the targets may be shuttered and the shutters opened for a period of time sufficient to deposit each layer. Certain advantageous processes to prepare media in accordance with the invention is described in more detail below.

In certain embodiments, media in accordance with the invention additionally comprises a protective layer 36 on a top surface 37 of the media. The protective layer 36 serves to protect the media from wear and the corrosive effects of any vapors present within the magnetic signal processing device. In one embodiment, the protective layer 36 is a carbon overcoat that is sputtered in place. Alternatively, the protective layer 36 may be composed of metals including rhodium, and nonmetallic materials such as carbon and inorganic nonmetallic carbides, nitrides, and oxides, e.g., silica or alumina. For a magnetic recording disk, the thickness of the protective layer may be between about 80 Å and about 350 Å; a thickness between about 100 Å and about 150 Å is currently preferred.

Thus, as will be appreciated, media in accordance with the invention generally include a substrate 30, a nucleating layer 32, a lattice 33, and a protective layer 36. The substrate in many embodiments is polished aluminum. The thickness of the nucleating layer 32 is generally thicker than 100 Å, or in certain embodiments between about 200 and about 600 Å. The lattice 32, in certain embodiments, includes bilayers (34 and 35) of cobalt (or an alloy thereof) and palladium or platinum. The thickness of the cobalt layers are between about 1.5 Å and 10 Å, or between about 2 Å and 7 Å, and in certain embodiments between about 3 Å and 5 Å. The thickness of the palladium or platinum layers are between about 5 Å and 15 Å, or between about 7 Å and 12 Å, and in certain embodiments between about 8 Å and 11 Å. The number of layers in the lattice 33, or its periodicity, is between about 10 and 30 or between about 15 and 25. In certain embodiments, the thickness of the lattice 33 and the nucleating layer 32 does not exceed 1500 Å.

Examples of certain media prepared in accordance with the invention are shown in the following Table. The Table provides a comparison of a variety of media prepared in accordance with the invention.

determined by integrating the noise power spectrum over a 25 mHz bandwidth by removing signal peaks. The contributions of head and electronics noise were subtracted from the total integrated noise power to determine the media noise power, the square root of which yields the media noise voltage, N. Signal-to-noise ratio (SNR) is determined from the following equation:

TABLE 1

| Sample No. | Keeper Layer Type/(Å) | Under Layer Type/(Å) | Magnetic Layer Type/(Å) | Nonmagnetic Layer Type/(Å) | Lattice Layers | Annealing | $H_c$ (Oe) | Output (mv) | Noise (mv) | SN Ratio (dBm) |
|---|---|---|---|---|---|---|---|---|---|---|
| 1 | n/a | Pd/560Å | Co/3.5Å | Pd/10Å | 20 | n/a | 5038 | 56.4 | 12.1 | 13.12 |
| 2 | n/a | Pd/280Å | Co/3.5Å | Pd/10Å | 20 | n/a | 3946 | 54.16 | 7.2 | 17.29 |
| 3 | n/a | Pd/280Å | Co/3.5Å | Pd/10Å | 20 | 260° C./20 min | 4100 | 54.16 | 7.2 | 17.29 |
| 4 | n/a | Pd/280Å | Co/3.5Å | Pd/10Å | 20 | n/a | 3410 | 61.96 | 14.01 | 12.79 |
| 5 | n/a | Pd/280Å | CoCr$_6$/3.5Å | Pd/10Å | 20 | n/a | n/m | 53.74 | 10.85 | 13.78 |
| 6 | n/a | Pd/280Å | CoCr$_{12}$/3.5Å | Pd/10Å | 20 | n/a | 2513 | 51.08 | 7.86 | 18.09 |
| 7 | plated NiFe | Pd/280Å | Co/3.5Å | Pd/10Å | 20 | n/a | n/m | 103.94 | 44.87 | 7.1 |
| 8 | plated NiFe | Pd/280Å | Co/3.5Å | Pd/10Å | 20 | 260° C./20 min | n/m | 105.36 | 19.17 | 14.65 |
| 9 | annealed NiFe | Pd/280Å | Co/3.5Å | Pd/10Å | 20 | n/a | n/m | 124.31 | 25.76 | 13.62 |
| 10 | annealed NiFe | Pd/280Å | CoCr$_6$/3.5Å | Pd/10Å | 20 | n/a | n/m | 120.03 | 21.66 | 14.82 |
| 11 | annealed NiFe | Pd/280Å | CoCr$_{12}$/3.5Å | Pd/10Å | 20 | n/a | n/m | 111.59 | 17.63 | 15.96 |
| 12 | annealed NiFe | Pd/280Å | CoCr$_{12}$/3.5Å | Pd/10Å | 20 | n/a | n/m | 94.3 | 15.85 | 15.4 |
| 13 | annealed NiFe | Pd/140Å | CoCr$_{12}$/3.5Å | Pd/10Å | 20 | n/a | 1801 | 114.1 | 17.33 | 16.3 |
| 14 | annealed NiFe | Pd/280Å | CoCr$_{12}$/3.5Å | Pd/10Å | 15 | n/a | n/m | 91.21 | 11.98 | 17.54 |
| 15 | annealed NiFe | Pd/280Å | CoCr$_{12}$/3.5Å | Pd/10Å | 25 | n/a | n/m | 125.9 | 23.69 | 14.46 |
| 16 | annealed NiFe | Pd/280Å | CoCr$_6$/3Å | Pd/10Å | 20 | n/a | n/m | 67.25 | 11.96 | 14.93 |
| 17 | annealed NiFe | Pd/300Å | Co/4Å | Pt/6.5Å | 15 | n/a | 2215 | 120.37 | 23.37 | 14.21 |
| 18 | annealed NiFe | Pd/470Å | CoCrTa/3Å | Pd/10Å | 20 | n/a | 2015 | 108.28 | 16.12 | 16.49 |
| 19 | n/a | Pd/280Å | CoCrTa/3Å | Pd/10Å | 20 | n/a | 1462 | n/m | n/m | n/m |
| 20 | n/a | Pd/280Å | CoCrTa/3.5Å | Pd/10Å | 20 | n/a | 968 | n/m | n/m | n/m |

In the Table, n/m corresponds to not measured. As will be observed in the Table, media in accordance with the invention can be manufactured with high degrees of coercivity, enhanced signal outputs, and reduced noise. The Table is separated into five distinct media types to demonstrate the effects of certain structures. Samples 1–3 illustrate media of the invention prepared with a Pd nucleating layer and a Co/Pd lattice, with no keeper layer. Sample 3, therein, illustrates the effects of annealing. Sample 1, therein, illustrates the effect of varying the thickness of the nucleating layer.

Figure 2A:
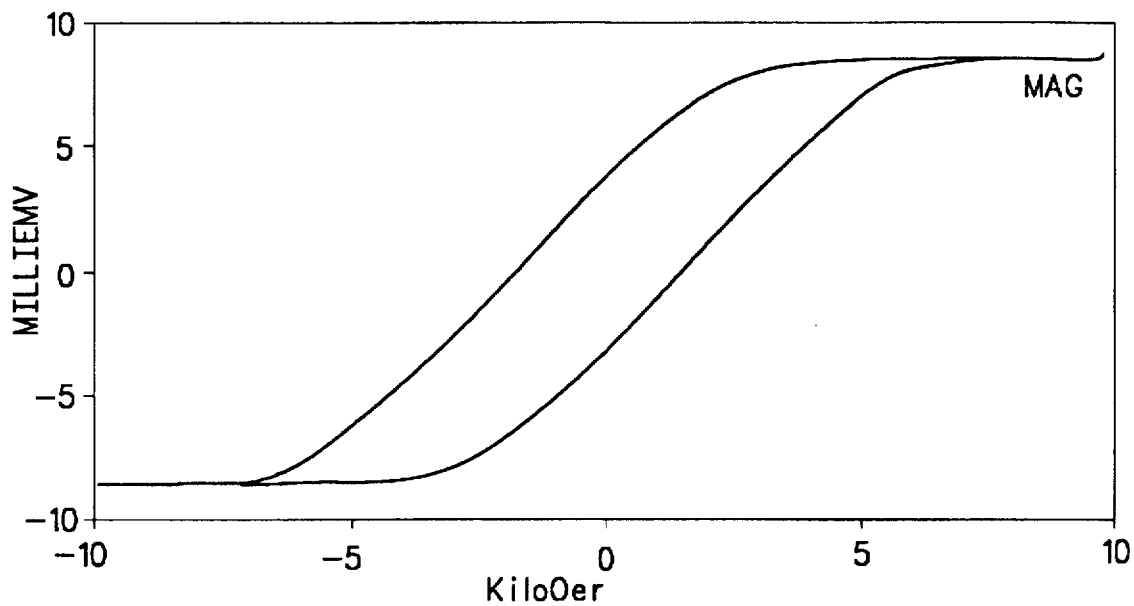
FIG. 2 is a comparison of an M-H loop diagram for a 1000 Å CoCrTa vertical media (FIG. 2a) versus an M-H loop diagram for a multi-layer media in accordance with the invention (FIG. 2b).
Figure 2B:
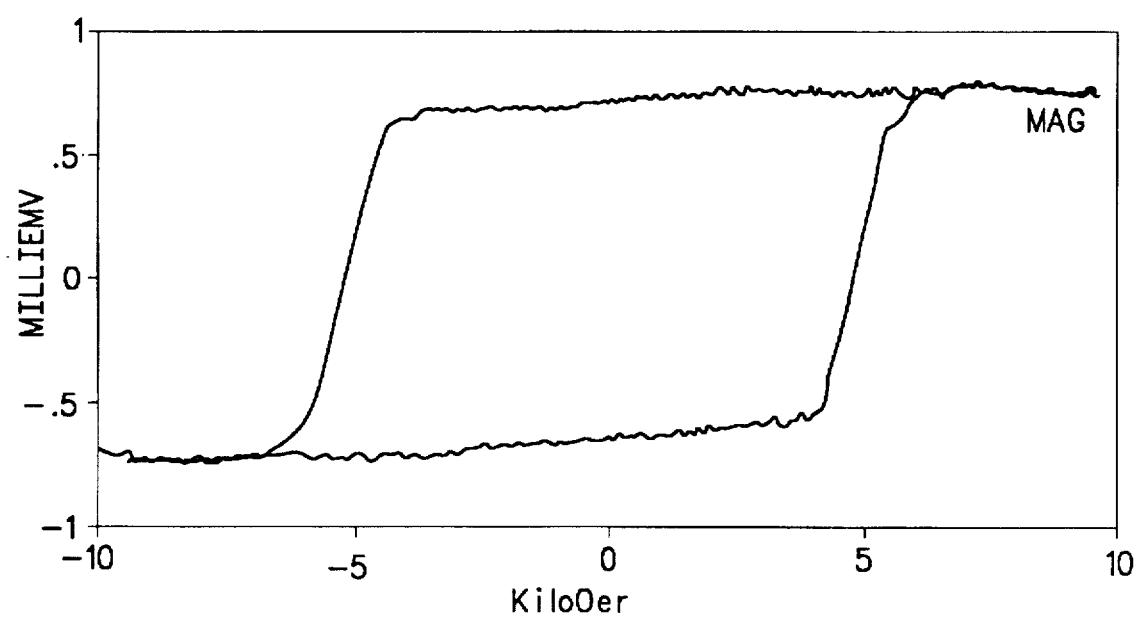

Coercivity, $H_c$, was measured with VSM. The maximum applied field was 10 KOe (as shown in FIGS. 2a and 2b). The field was applied perpendicular to the media surface. Output, noise, and signal-to-noise ratio were measured after preamplification. The head used has separate read and write elements: a ring head write element and a magnetoresitive element read head. The write head had a gap length of 0.35 μm, a gap width of 4.3 μm, 15 turns, and a write current of 20 mA. The read element had a single MR read element having a width of 3.5 μm.

In each of the examples shown in the Table, the signal was recorded at 73 kfci and an IPS of 469. The noise was $$SNR = 20 * \log \frac{RMS \text{ output}}{N}$$

Samples 4–6 again illustrate media of the invention prepared with a Pd nucleating layer and a Co/Pd lattice, with no keeper layer. In Samples 5 and 6, therein, Cr is co-sputtered with the Co to form an CoCr alloy to show the effects of utilization of alloys.

Samples 7–16 illustrate media of the invention prepared with a Pd nucleating layer and a Co/Pd lattice with a keeper layer. In Samples 10–16, therein, Cr is co-sputtered with the Co to form an CoCr alloy to show the effects of utilization of alloys. In addition, the effects of annealing is shown in Sample 7, and the effects of the number of lattice layers is shown in Samples 14 and 15.

Sample 17 illustrates media of the invention prepared with a Pt nucleating layer and a Co alloy/Pt lattice with a keeper layer.

Samples 18–20 illustrate media of the invention prepared with a Pd nucleating layer and a CoCrTa alloy/Pd lattice. Sample 18 illustrates the effect of a keeper layer and Sample 20 illustrates the effect of increasing the CoCrTa layer thickness.

Several trends are evident through a comparison of the Samples. First, extremely high coercivities are possible through the use of a nucleating layer and simple Co/Pd lattice, as demonstrated by Sample 1. However, as seen in Samples 2 and 3, the output signal is not exceptional. Output signals can be boosted through use of a keeper layer, as shown in Samples 7–18. Moreover, noise can be reduced through annealing (Samples 3 and 7) and also through the utilization of certain alloy compositions (Samples 6 and 17). Further, through increasing the number of lattice layers, output can be enhanced, and noise levels stabilized as shown in Samples 14 and 15.

More refined data regarding the fine tuning of the media to enhance output while reducing noise is discussed below.

Process of Manufacture of Media of the Invention

Media in accordance with the invention can be prepared through use of conventional sputtering processes, such as DC Magnetron sputtering, RF sputtering, and vacuum vapor deposition. In this work, DC Magnetron sputtering was used. Two inch diameter circular-type targets of Co, Cr, Pt, Pd, and CoCrTa were used. There are four cathodes in the sputtering machine which allows the sputtering of four targets separately or simultaneously. The substrate is spun in the sputtering chamber between about 1 and about 100 rpm, similar to rotating table-type sputtering. The substrate is exposed to any one, or any combination, of the targets during the sputtering process. The power on/off for each of the four targets is individually controlled through a programmable controller. Similarly, the power to each of the four targets is individually controlled. Underlayers and multilayers can be formed by powering on and off selected targets. The thickness of each layer can be controlled through either controlling the power to the target or through controlling the target power-on time.

In order to study the effect of base pressure on media noise, we varied the base pressure prior to sputtering between about $5 \times 10^{-5}$ and about $2 \times 10^{-7}$ Torr. Sputtering gas (high purity argon) pressure was held at about 10–20 m Torr during deposition.

We surprisingly discovered that base pressure and sputtering pressure effect the media noise. High sputtering pressure is often used for low media noise. Thus, in the majority of examples contained in the present application a sputtering pressure of 15 μm was used to attain reduced media noise. In addition, we unexpectedly discovered that media noise can be further controlled through the inclusion of oxygen in the sputtering gas. For example, through the inclusion of about 0.05 to about 0.5% (v/v) oxygen in the sputtering gas, media noise can be appreciably reduced.

Properties of Media in Accordance with the Invention

Therefore, turning attention to FIG. 2, there is provided a comparison of an M-H loop diagram for a 1000 Å CoCrTa vertical media (FIG. 2a) versus an M-H loop diagram for a multi-layer media in accordance with the invention (FIG. 2b). The M-H loop diagram in FIG. 2b is taken from the medium of Sample 1, shown in Table 1.

The coercivity and Mrt of prior art media is shown in FIG. 2a. The coercivity is 1669 Oe and the Mrt is 1.6 memu/cm$^2$. Further, the squareness of the loop in the diagram is approximately 0.39. In contrast, the media in accordance with the invention, as shown in FIG. 2b, possesses a coercivity of 5038 Oe, an Mrt of 0.7 memu/cm$^2$, and the M-H loop in the diagram shows a squareness of 0.83.

Figure 3:
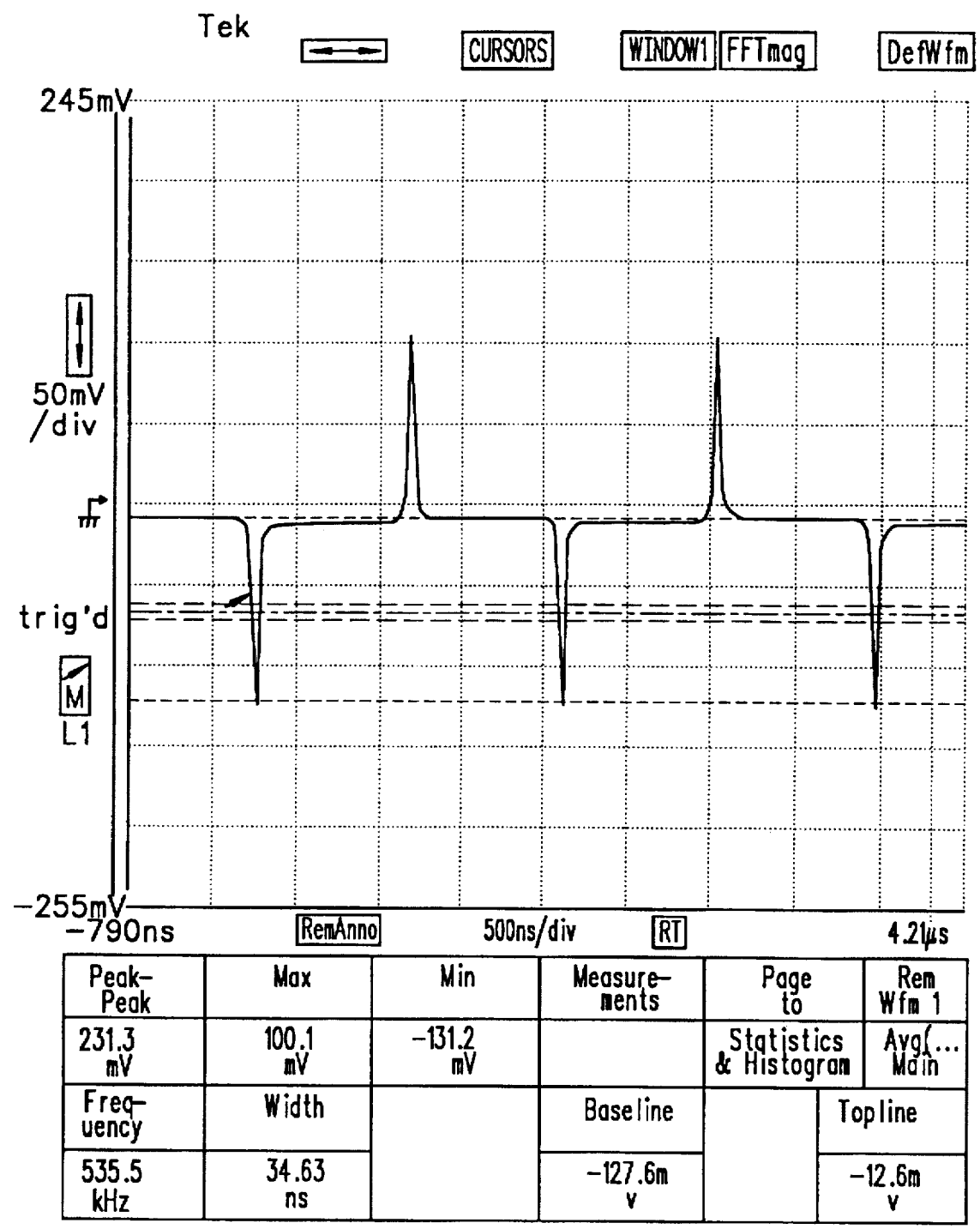
FIG. 3 is a plot showing isolated pulses from a $CoCr_{10.4}Ta_4$ longitudinal magnetoresistive (MR) recording medium, having a thickness of between about 200 and 250 Å, recorded by a ring head and read with an MR sensor.
Figure 4:
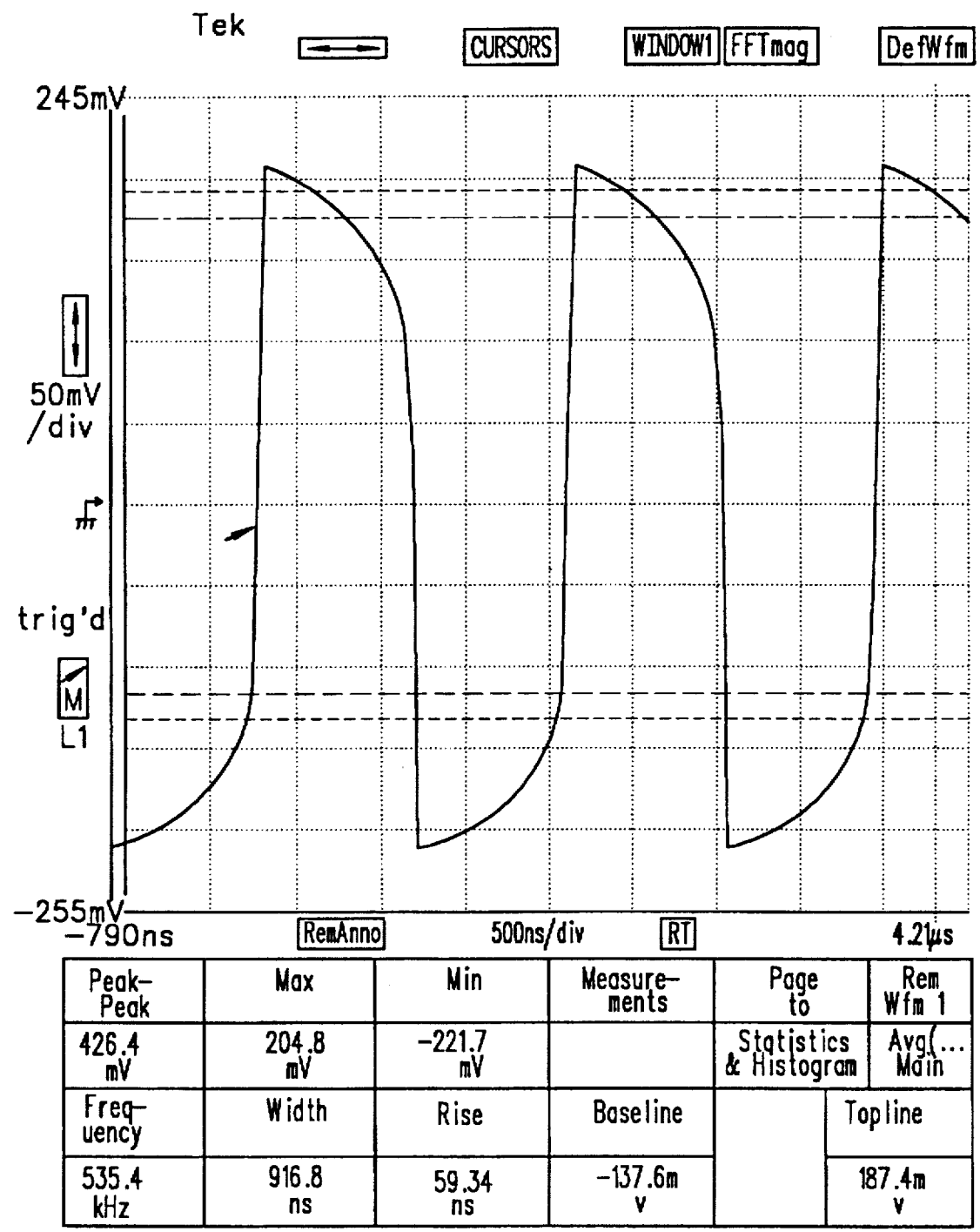
FIG. 4 is a plot showing isolated pulses from a 750 Å $CoCr_{17}Ta_5$ vertical recording medium, with a keeper layer, recorded by a ring head and read with an MR sensor.
Figure 5:
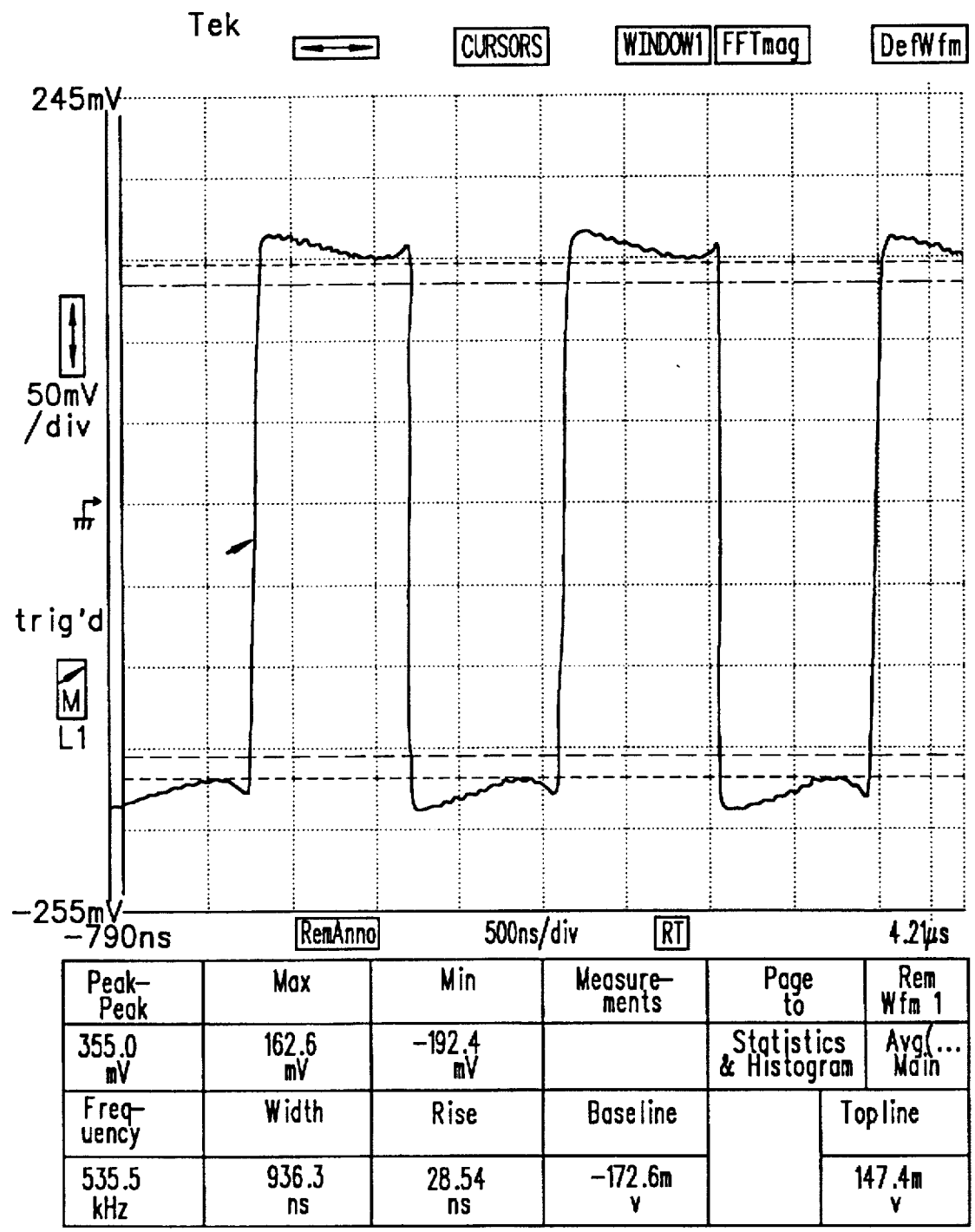
FIG. 5 is a plot showing isolated pulses from a multi-layer medium in accordance with the invention, having a keeper layer, recorded by a ring head and read with an MR sensor.

FIGS. 3–5 are plots showing isolated pulses from two prior art media (FIGS. 3 and 4) and media in accordance with the invention (FIG. 5). FIG. 3 is a plot showing isolated pulses from a CoCr$_{10.4}$Ta$_4$ longitudinal magnetoresistive (MR) recording medium, having a thickness of 250 Å, recorded by a ring head and read with an MR sensor. The media possessed an Mrt of 1 memu/cm$^2$ and a coercivity of 2100 Oe. The plot shows a PW 50 is 34.6 ns and a peak-to-peak output of 231 mv after preamplification.

FIG. 4 is a plot showing isolated pulses from a 750 Å CoCr$_{17}$Ta$_5$ vertical recording medium, with a keeper layer, recorded by a ring head and read with an MR sensor. The media possessed an Mrt of 1.6 memu/cm$^2$. The plot shows an isolated peak with poor squareness and smeared transition. The rise time is greater than 59 ns and peak-to-peak output is 426 mv after preamplification.

FIG. 5 is a plot showing isolated pulses from a multi-layer medium in accordance with the invention, having a keeper layer, recorded by a ring head and read with an MR sensor. The media possessed an Mrt of 0.7 memu/cm$^2$. The plot shows a rise time of 28.5 ns and a peak-to-peak output of 355 mv after preamplification. This media is illustrated in Table 1, Sample 8.

Figure 6:
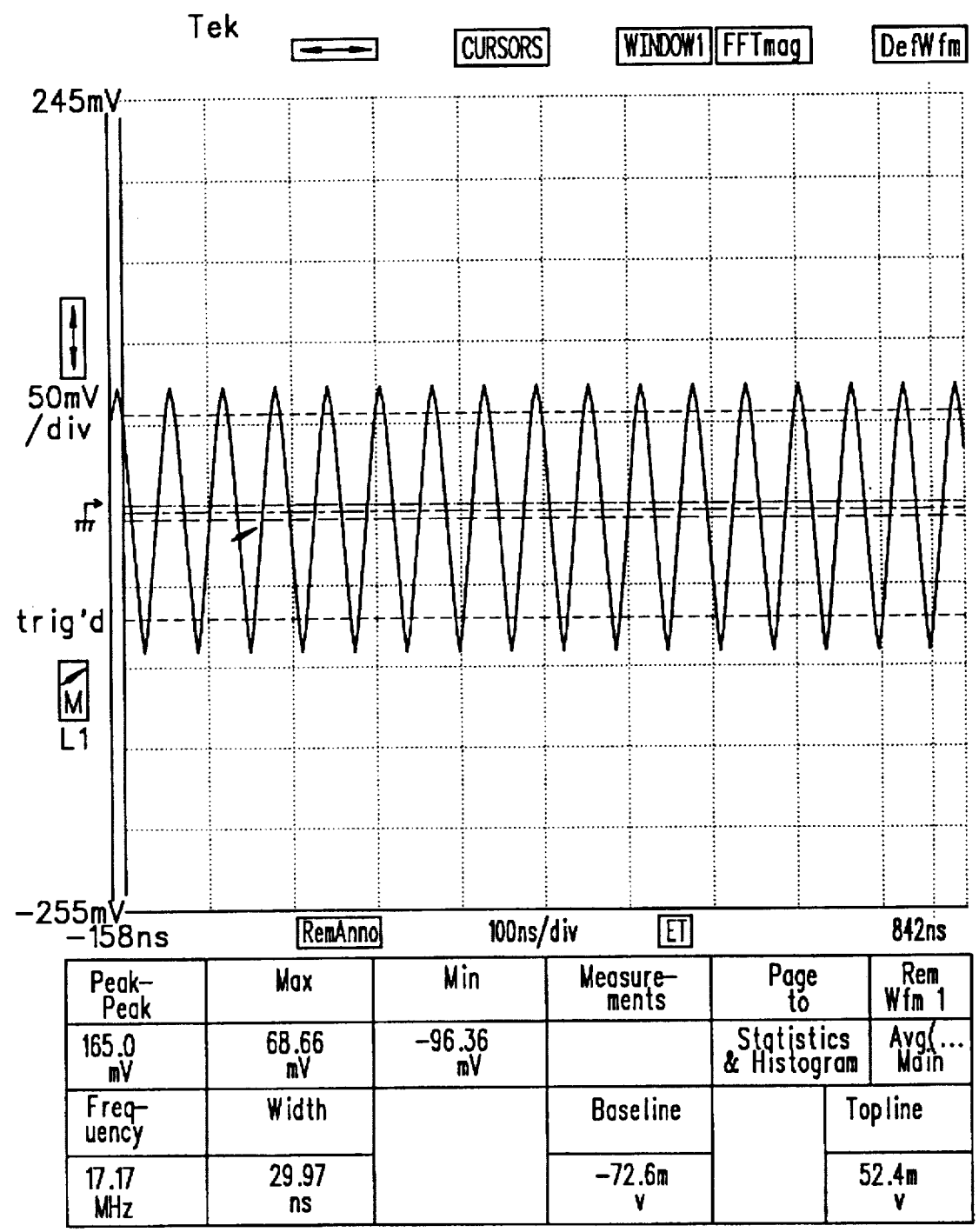
FIG. 6 is a plot showing signal output at 73 kcfi from the media displayed in FIG. 3, recorded by a ring head and read with an MR sensor.
Figure 7:
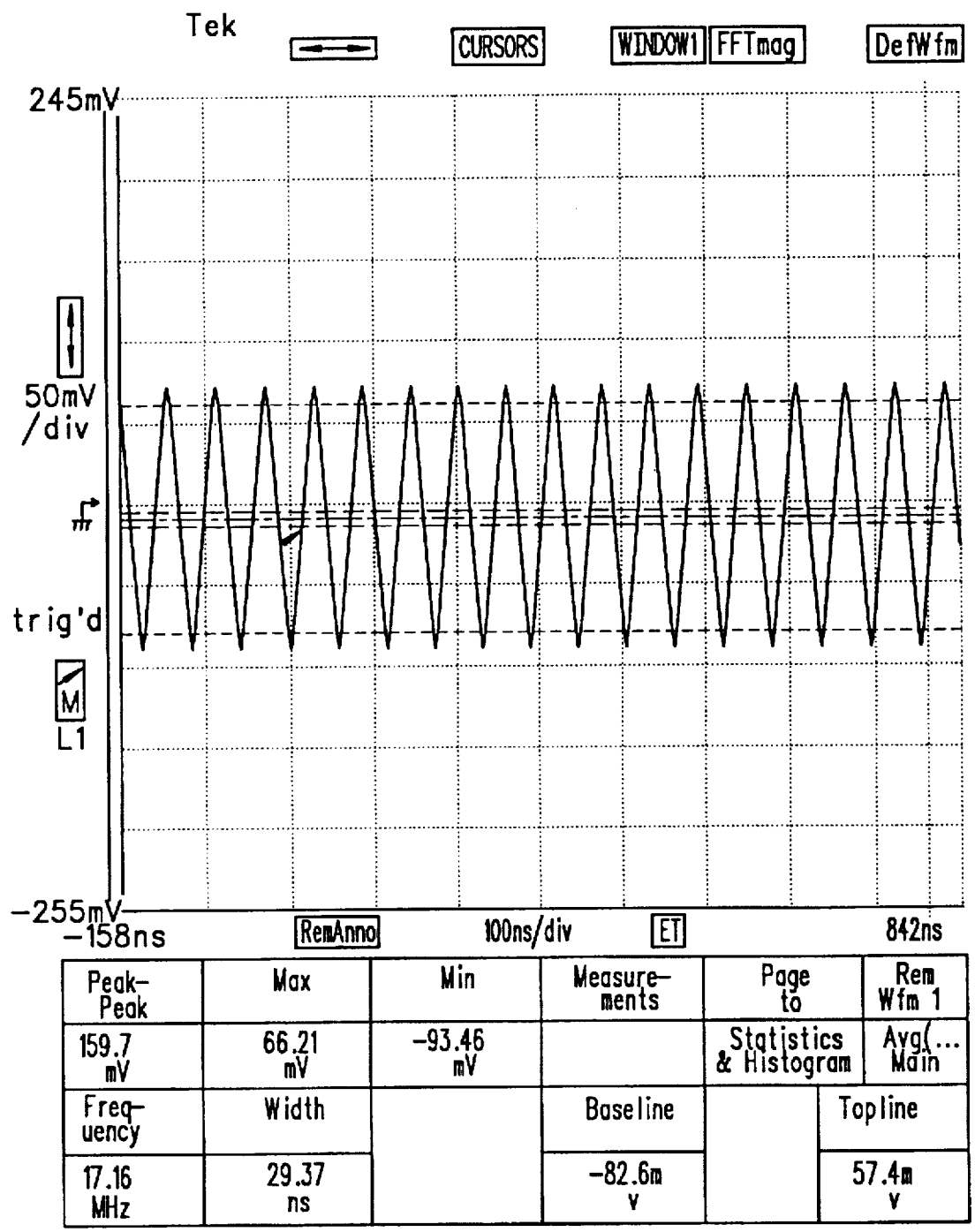
FIG. 7 is a plot showing signal output at 73 kcfi from the media displayed in FIG. 4, recorded by a ring head and read with an MR sensor.
Figure 8:
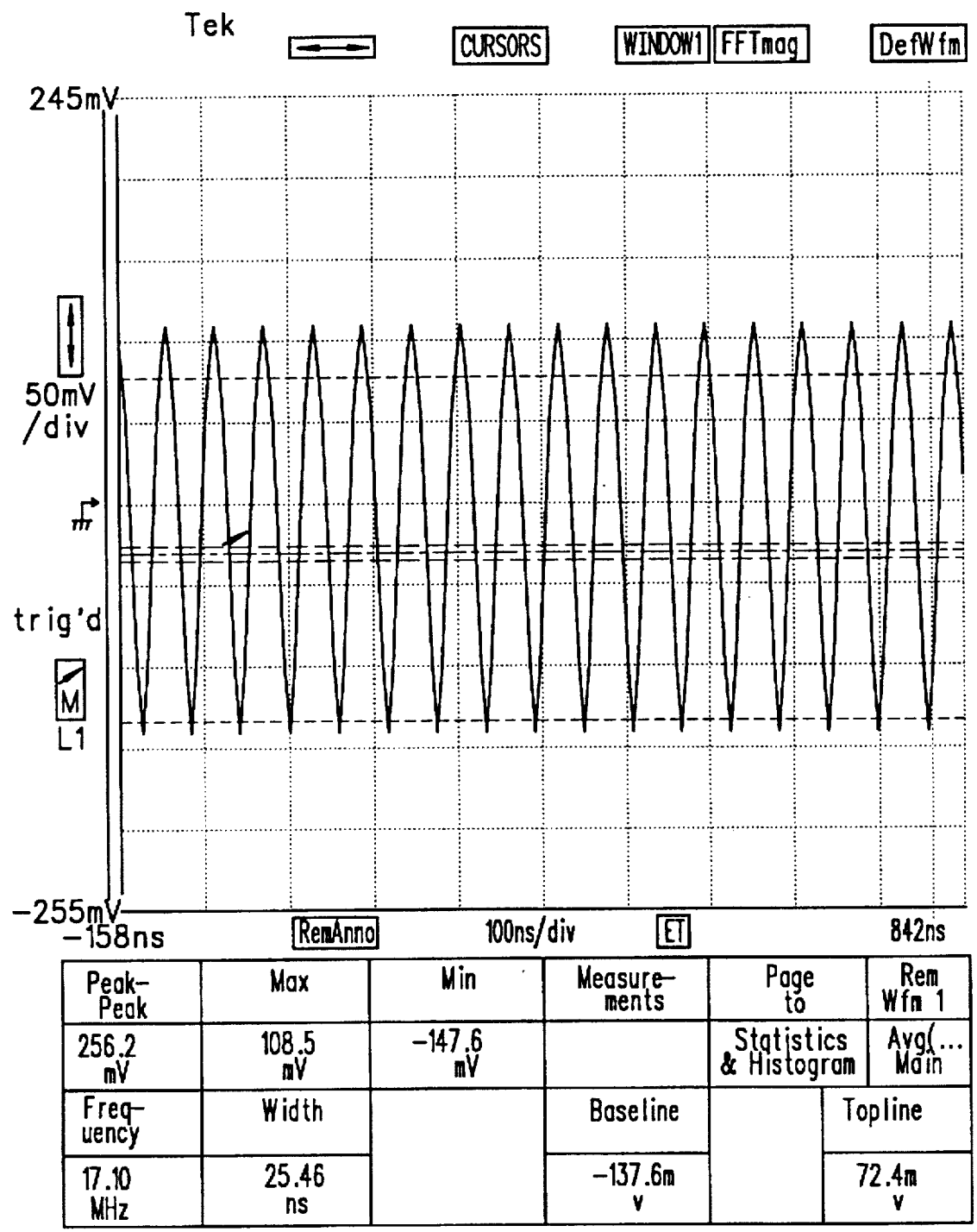
FIG. 8 is a plot showing signal output at 73 kcfi from the media displayed in FIG. 5, recorded by a ring head and read with an MR sensor.

The pulses obtained from the media of the invention are significantly improved over prior art media. The squareness of the pulses and rise time are highly improved over each of the CoCrTa media in FIGS. 3 and 4. Further, the output voltage of the media of the invention is comparable to the output voltage displayed by the media in FIG. 4 and significantly improved over the voltage displayed by the media in FIG. 3. Turning now to FIGS. 6–8, there are provided plots showing signal output at 73 kcfi from the CoCr$_{10.4}$Ta$_4$ longitudinal magnetoresistive (MR) recording media (FIG. 6) (discussed in FIG. 3), 750 Å CoCr$_{17}$Ta$_5$ vertical recording medium (FIG. 7) (discussed in FIG. 4), and media in accordance with the invention (FIG. 8) (discussed in FIG. 5). In each, the media was recorded on by a ring head and read with an MR sensor. The plots particularly show peak-to-peak outputs of each of the media. In FIG. 6, the CoCr$_{10.4}$Ta$_4$ longitudinal magnetoresistive (MR) recording media shows a peak-to-peak output of 165 mv after preamplification. In FIG. 7, the 750 Å CoCr$_{17}$Ta$_5$ vertical recording medium shows a peak-to-peak output of 160 mv after preamplification. In FIG. 8, the media of the invention shows a peak-to-peak output of 256 mv after preamplification.

The output of the media of the present invention clearly surpasses media of the prior art in output signal at 73 kcfi. The signal output from the media of the present invention is approximately 40% higher than the longitudinal media and the perpendicular media of the prior art. We expect that the drop of the high frequency output for the vertical media of the prior art is due to its poor resolution even though the vertical media has high output at low frequencies.

Figure 9:
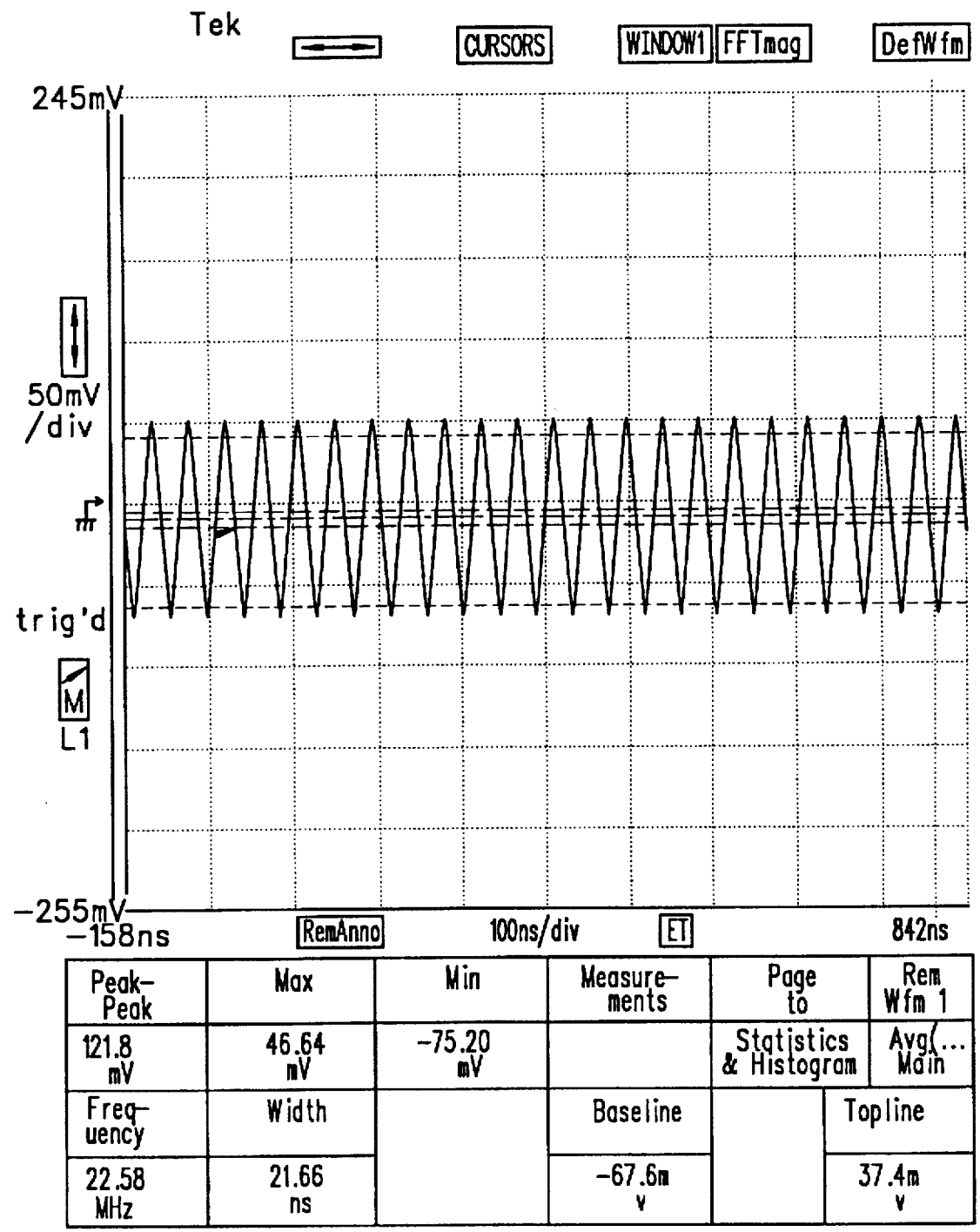
FIG. 9 is a plot showing signal output at 95 kcfi from the media displayed in FIG. 3, recorded by a ring head and read with an MR sensor.
Figure 10:
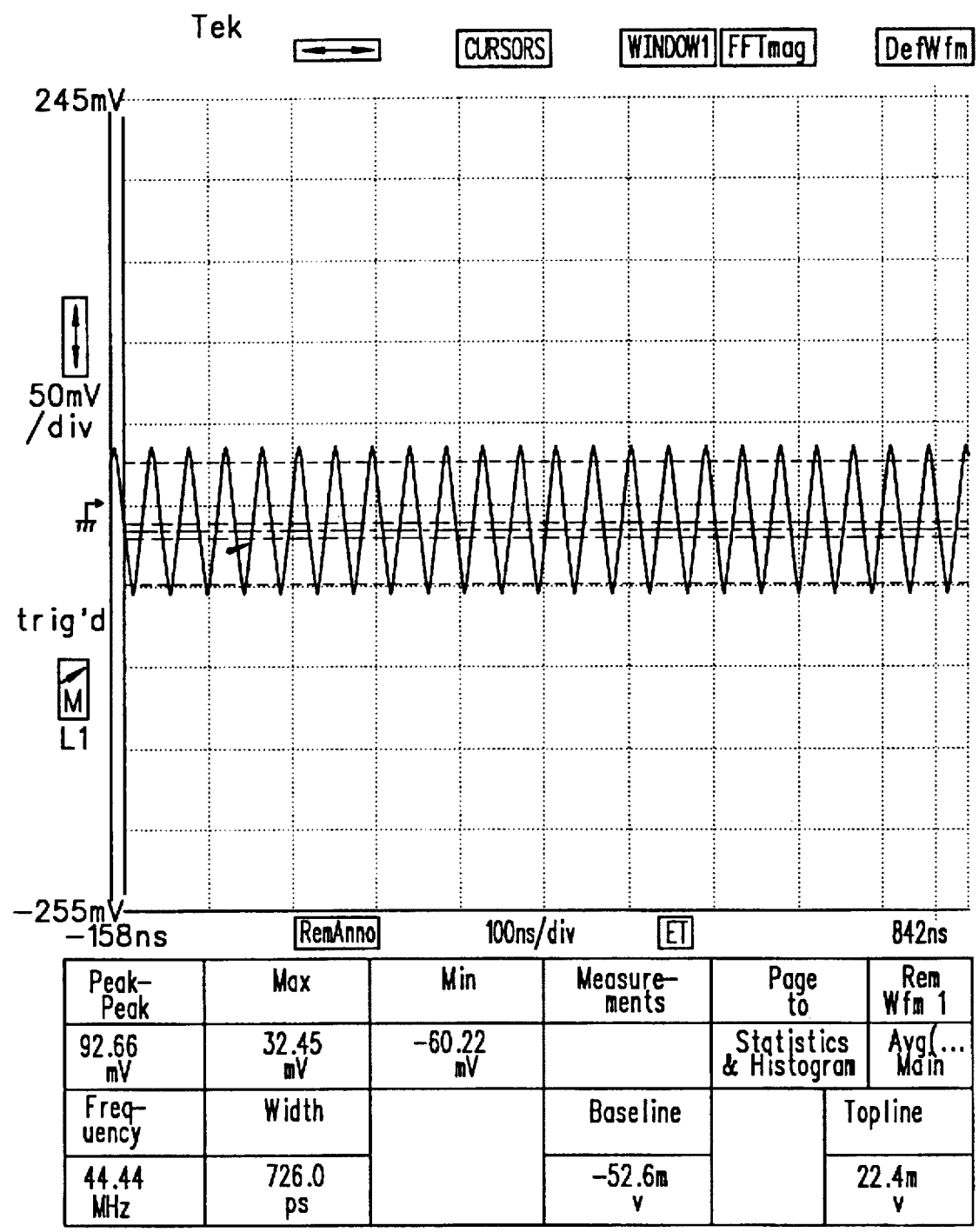
FIG. 10 is a plot showing signal output at 95 kcfi from the media displayed in FIG. 4, recorded by a ring head and read with an MR sensor.
Figure 11:
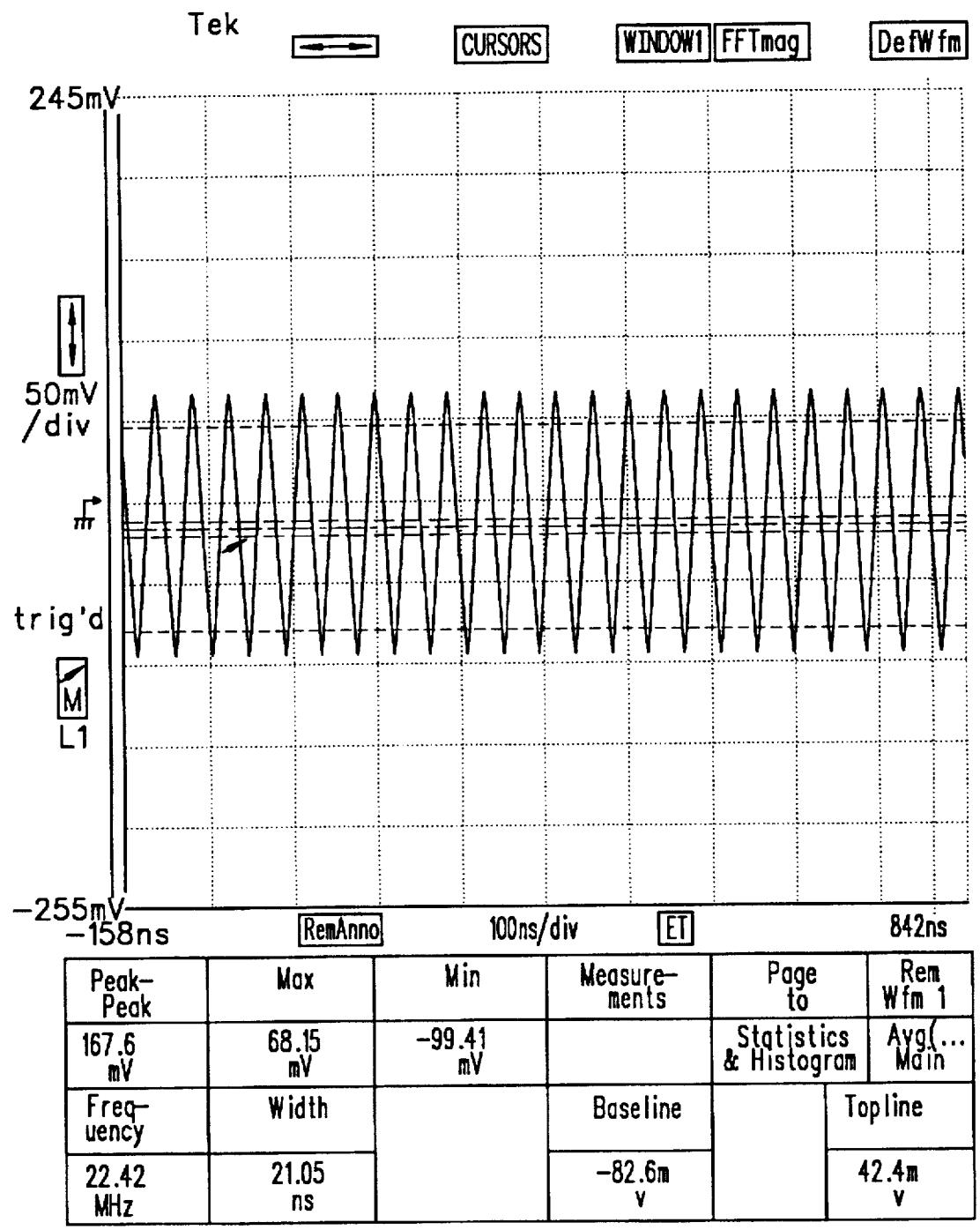
FIG. 11 is a plot showing signal output at 95 kcfi from the media displayed in FIG. 5, recorded by a ring head and read with an MR sensor.

Similarly, FIGS. 9–11 are plots showing signal outputs at 95 kcfi from the CoCr$_{10.4}$Ta$_4$ longitudinal magnetoresistive (MR) recording media (FIG. 9) (discussed in FIG. 3), 750 Å CoCr$_{17}$Ta$_5$ vertical recording medium (FIG. 10) (discussed in FIG. 4), and media in accordance with the invention (FIG. 11) (discussed in FIG. 5). In each, the media was recorded on by a ring head and read with an MR sensor. The plots particularly show peak-to-peak outputs of each of the media. In FIG. 9, the CoCr$_{10.4}$Ta$_4$ longitudinal magnetoresistive (MR) recording media shows a peak-to-peak output of 122 mv after preamplification. In FIG. 10, the 750 Å CoCr$_{17}$Ta$_5$ vertical recording medium shows a peak-to-peak output of 93 mv after preamplification. In FIG. 11, the media of the invention shows a peak-to-peak output of 168 mv after preamplification.

Again, the output of the media of the present invention clearly surpasses media of the prior art in output signal at 95 kcfi. The signal output from the media of the present invention is approximately 30% higher than the longitudinal media and 45% higher than the perpendicular media of the prior art.

Figure 12:
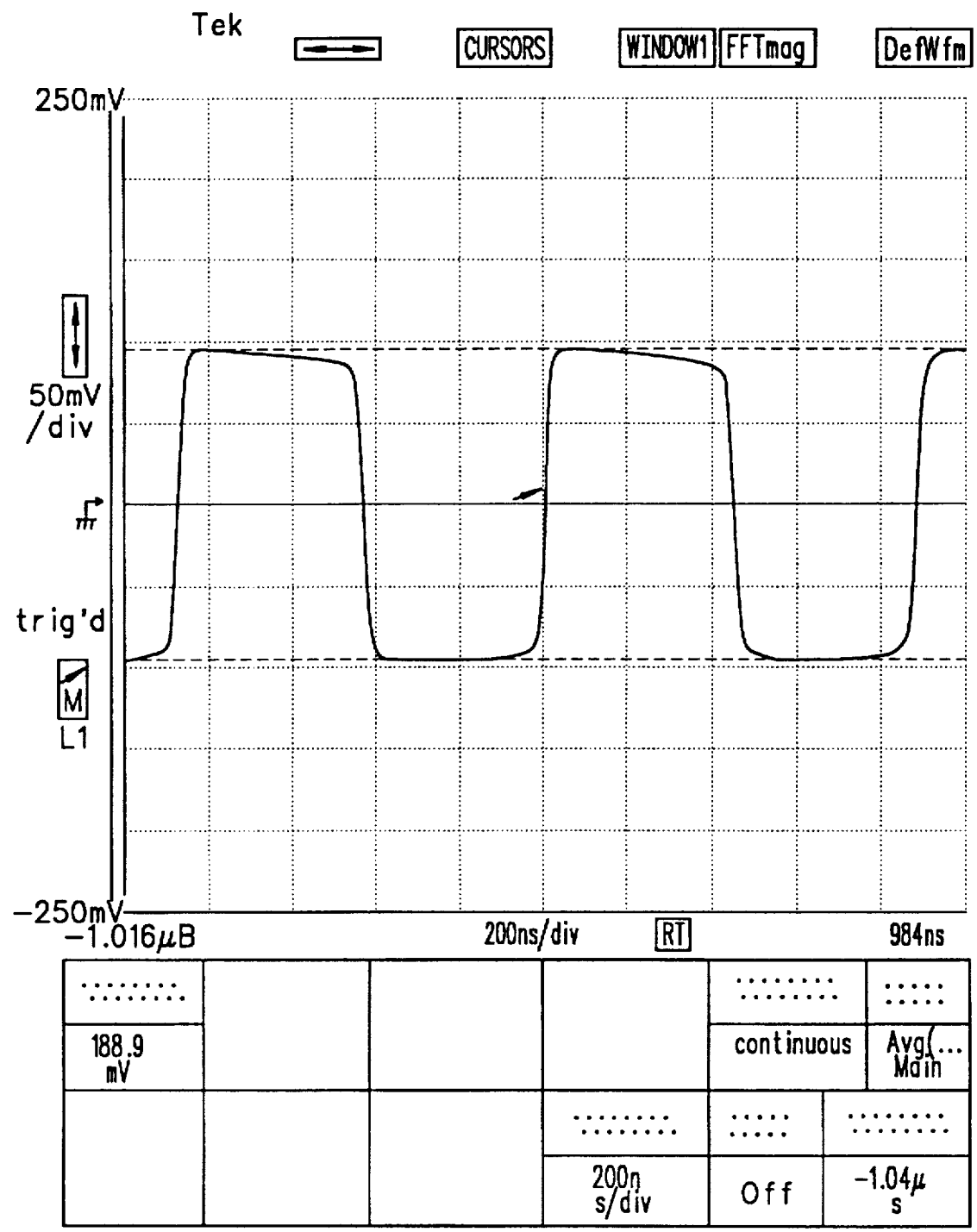
FIG. 12 is a plot showing a low density play back signal of a media in accordance with the invention read with a conventional (TDK) MR head.

Referring now to FIG. 12, there is provided a plot showing a low density play back signal of a media in accordance with the invention read with a conventional (TDK) MR head. The peak-to-peak output is approximately 460 mv. The output is very square and symmetrical.

Figure 13A:
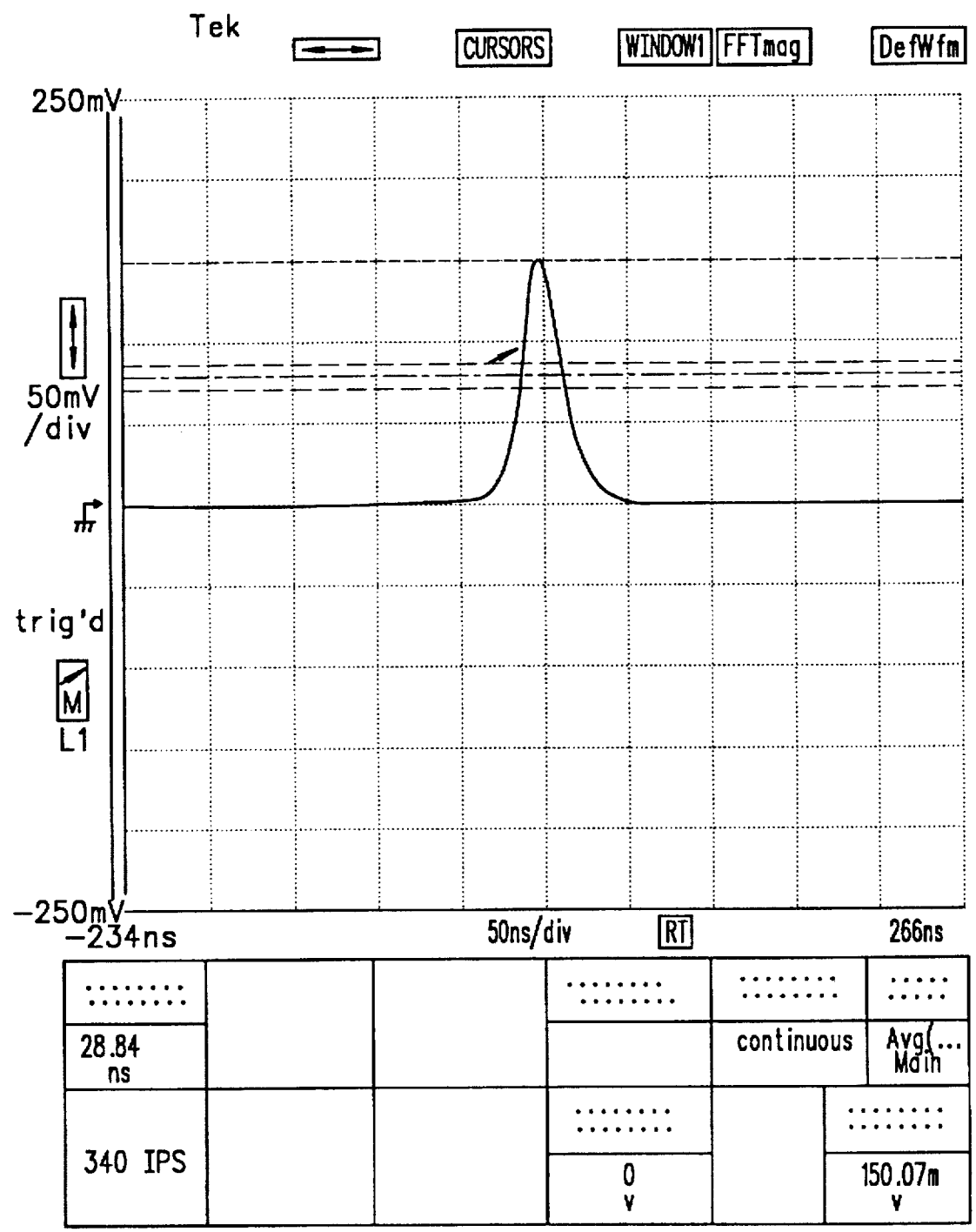
In FIG. 13a, a positive pulse is shown and, in FIG. 13b, a negative pulse is shown.
Figure 13B:
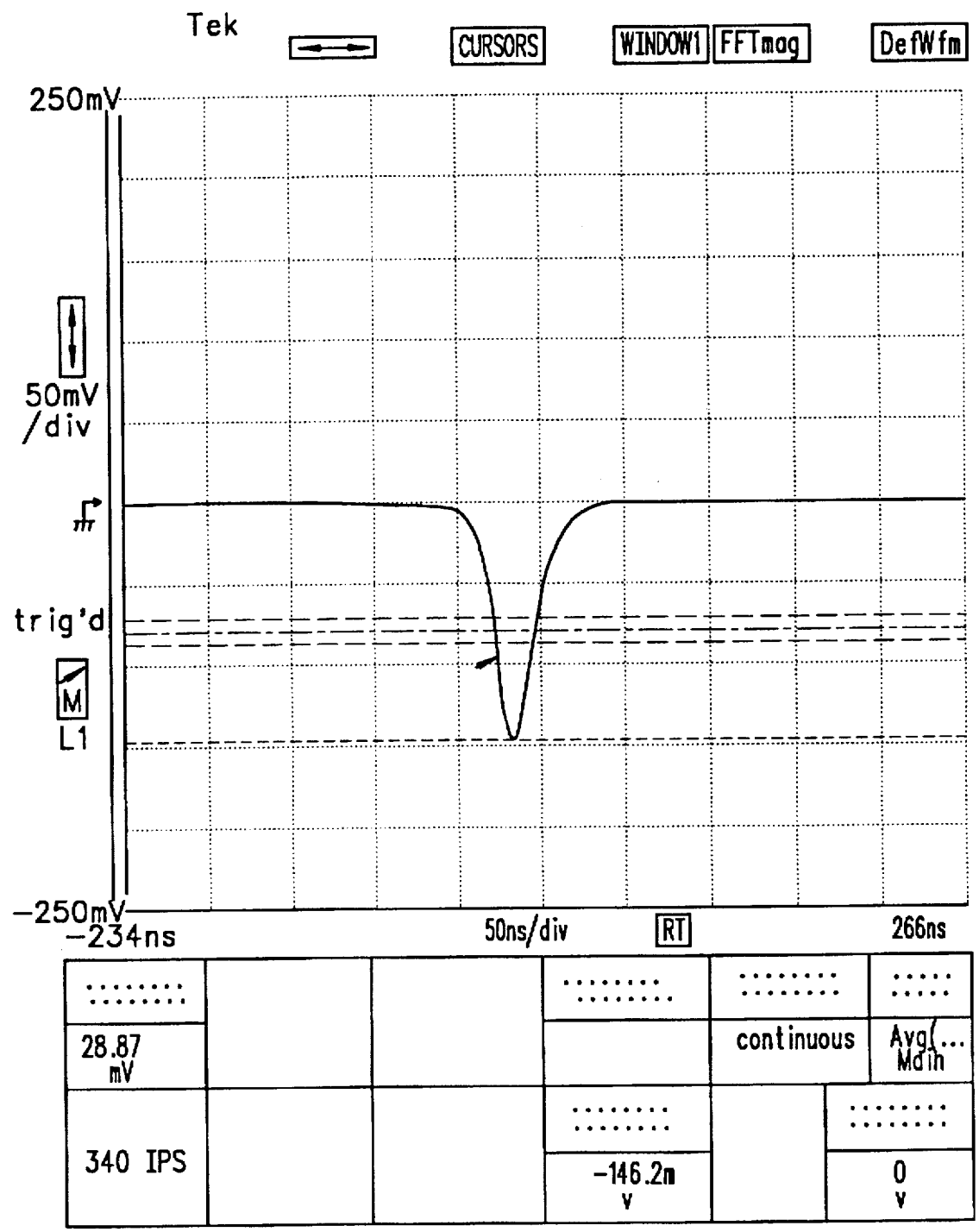
FIG. 13 is two plots showing differentiated isolated pulses from media in accordance with the invention.

Referring now to FIG. 13a and 13b, there are provided two plots showing differentiated isolated pulses from media in accordance with the invention. In FIG. 13a, a positive pulse is shown and, in FIG. 13b, a negative pulse is shown. The PW 50 in FIG. 13b was calculated to be 9.8 µin. Differentiation of the pulses is useful since differentiation provides some boost to the signal, existing channel hardware can be utilized, low frequency noise effects are minimized, and the positive and negative PW 50 and amplitude becomes fully symmetrical, even though the head used herein had a fair amount of +/− asymmetry.

PW 50's for media in accordance with the invention are extremely narrow. The narrow width of the PW 50 indicates that the PW 50 should not be spread by the gap length. Rather, the transition length appears limited by the grain size of the media and the space between the MR strip and the media. This is indicated since PW 50 may be approximated by the equation 2(D+A), where D is the spacing between the MR strip and the media, and A is the transition length. In the head that was utilized, the spacing (D) is approximately 3.5 µin. Thus, grain size appears to be approximately 1.2 µin.

Since the practical spacing between the head and the media can be reduced to approximately 2 µin, utilizing conventional technology, and grain size can likely be reduced by a factor of two a PW 50 of 5.2 µin can likely be achieved in media in accordance with the invention. Such a result translates to a linear data density of greater than about 400 kbits/in, if the density (DataBits/PW 50) is higher than 2.

Figure 14:
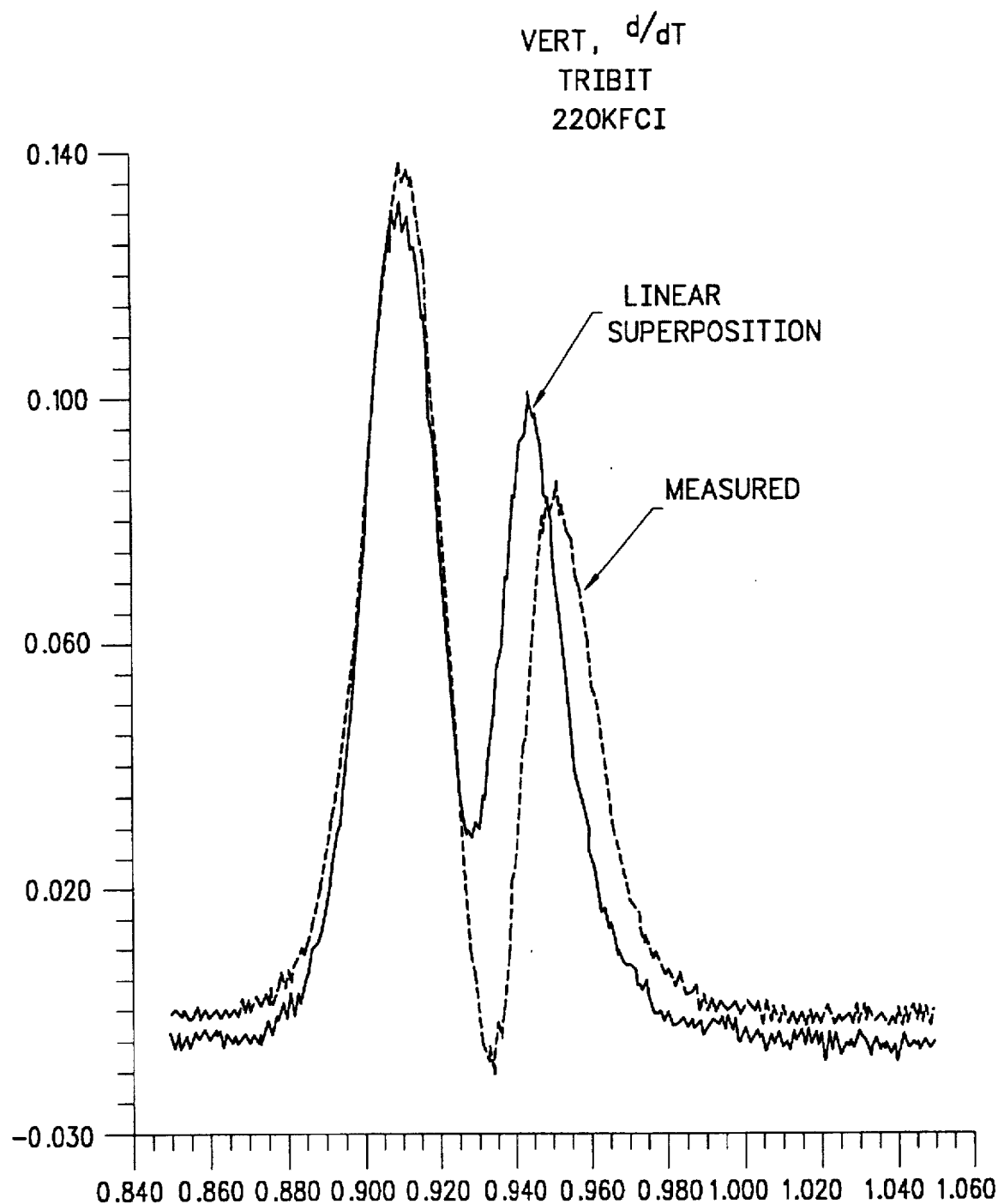
FIG. 14 is a plot showing a measured differentiated tribit pattern ( . . . ) versus a theoretical tribit pattern (_) from a linear superposition of an isolated pulse at 220 kfci (kiloflux changes per inch).

Turning now to FIG. 14, there is provided a plot showing a measured differentiated tribit pattern ( . . . ) versus a theoretical tribit pattern (__) from a linear superposition of an isolated pulse at 220 kfci of media in accordance with the invention. The actual output of the media in accordance with the invention increases relative to the linear superposition plot instead of decreasing as in conventional longitudinal media. The reason for the increase appears to be due to the fact that there appears to be no percolation in media in accordance with the invention. The write shift appears visible in the plot. For example, succeeding transitions are pushed relatively later than the superposition plot which is opposite from what is observed in longitudinal recording. As will be appreciated, this effect is easily remedied through write precompensation. Therefore, all nonlinearities should be due to demagnetization shifts.

Figure 15:
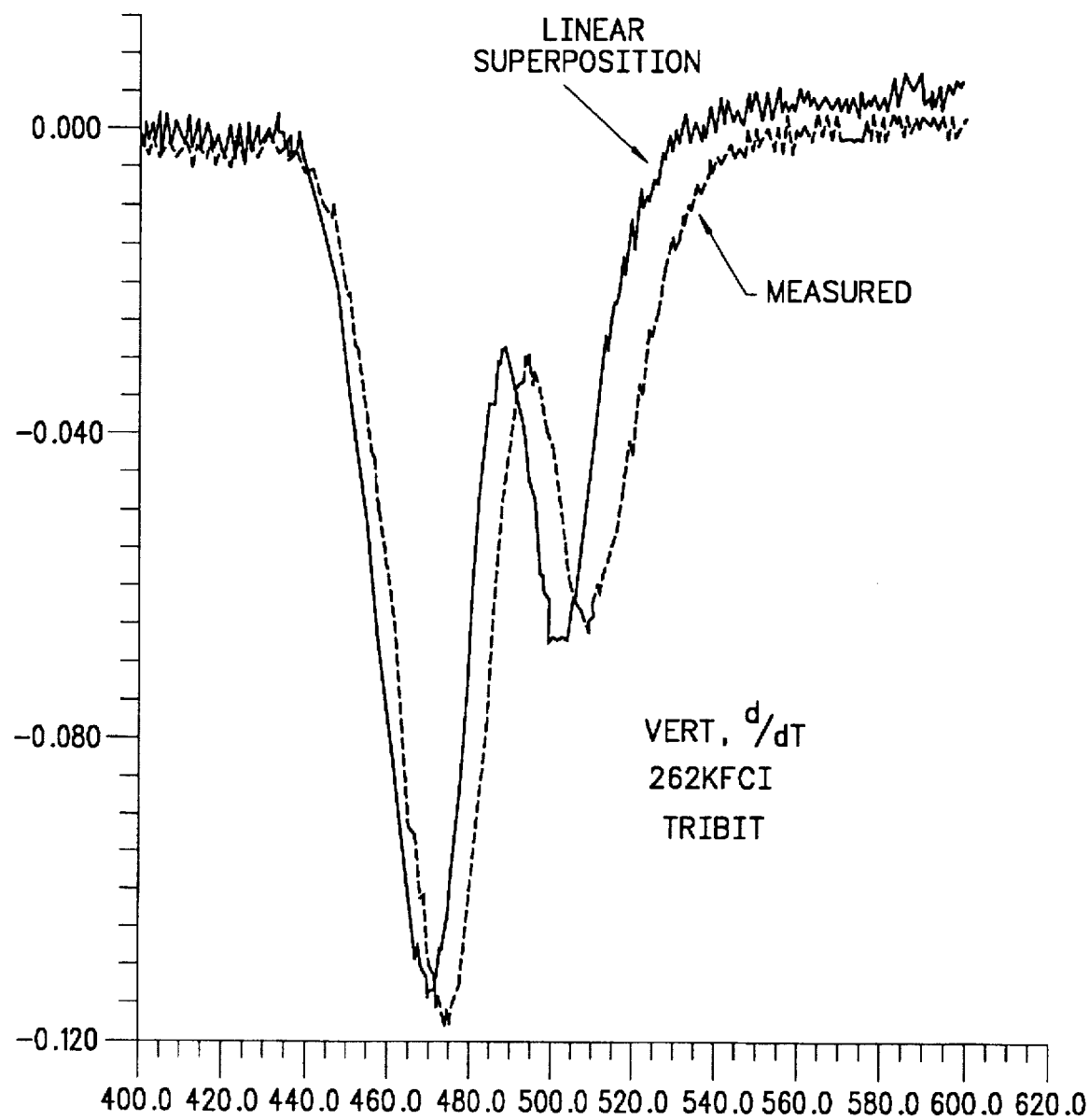
FIG. 15 is a plot showing a measured differentiated tribit pattern ( . . . ) versus a theoretical tribit pattern (_) from a linear superposition of an isolated pulse at 262 kfci.

A similar effect is observed in FIG. 15, which is a plot showing a measured differentiated tribit pattern ( . . . ) versus a theoretical tribit pattern (__) from a linear superposition of an isolated pulse at 262 kfci of media in accordance with the invention. This level of resolution far exceeds any conventional media, either longitudinal or vertical.

It is expected that through use of media in accordance with the invention, area densities higher than 1 GBit/in² can be achieved. The linear density in FIG. 15 is 349 KBPI. The read element width is 3.5 µm. Thus, 5000 tracks per inch (TPI) track density can be achieved. With a track density of 5000 TPI, an area density of 1.745 GBit/in² is obtained.

Control of the Noise of Media of the Present Invention

As mentioned above, we have also discovered that is possible to control the noise of the media of the present invention. Some of the factors that contribute to control of media noise are discernable in connection with Table 1. However, there are certain general principles that we have discovered to be useful in minimizing media noise. Such principles, in addition to utility in connection with the media of the present invention, are also expected to be useful in the design and fabrication of a variety of vertical magnetic media.

The general principles that we have discovered for controlling media noise include the following: (i) annealing as sputtered films in the presence of oxygen or air, (ii) annealing the keeper layer prior to deposition of the vertical medium, (iii) doping vertical cobalt media to form an alloy, such as chromium or chromium/tantalum, (iv) adjusting the number of layers in the vertical recording layer, and (v) conducting the sputtering of the vertical recording medium within the presence of oxygen. Each of these factors will be discussed serially below.

Annealing of as Sputtered Films

In general, we have demonstrated that it is possible to reduce the media noise in vertical recording media through annealing an as sputtered film. In accordnace with the invention, annealing is accomplished through exposing the as sputtered film under relatively moderate temperatures and for relatively short periods of time. For example, in certain embodiments, annealing of the media is accomplished at a temperature of about 260° C. and for no more than about 30 minutes. In certain embodiments, the films are annealed at a temperature of about 260° C. for about 10 to 20 minutes. Further, in other embodiments, the annealing step is conducted in the presence of air or oxygen.

Without wishing to be bound to any particular theory or mode of operation, it appears as though the annealing may act to further orient the crystal structure of the vertical magnetic recording layer. However, in order for the annealing to be effective, the temperature of the annealing and the time duration of the annealing must be relatively carefully controlled. Where annealing times or temperatures are too long, or too high, the annealing still appears to lower the noise of the media, however, the output of the media is also reduced. Thus, the signal to noise ratio is not optimized.

Where the annealing is accomplished in the presence of oxygen or air, the effects of the annealing are maximized. While it is not clear what effect is caused by the presence of oxygen or air, it is possible that there is some formation of oxides within the grain boundaries of the recording media, which decouple the magnetic exchange coupling of the grains.

Figure 16:
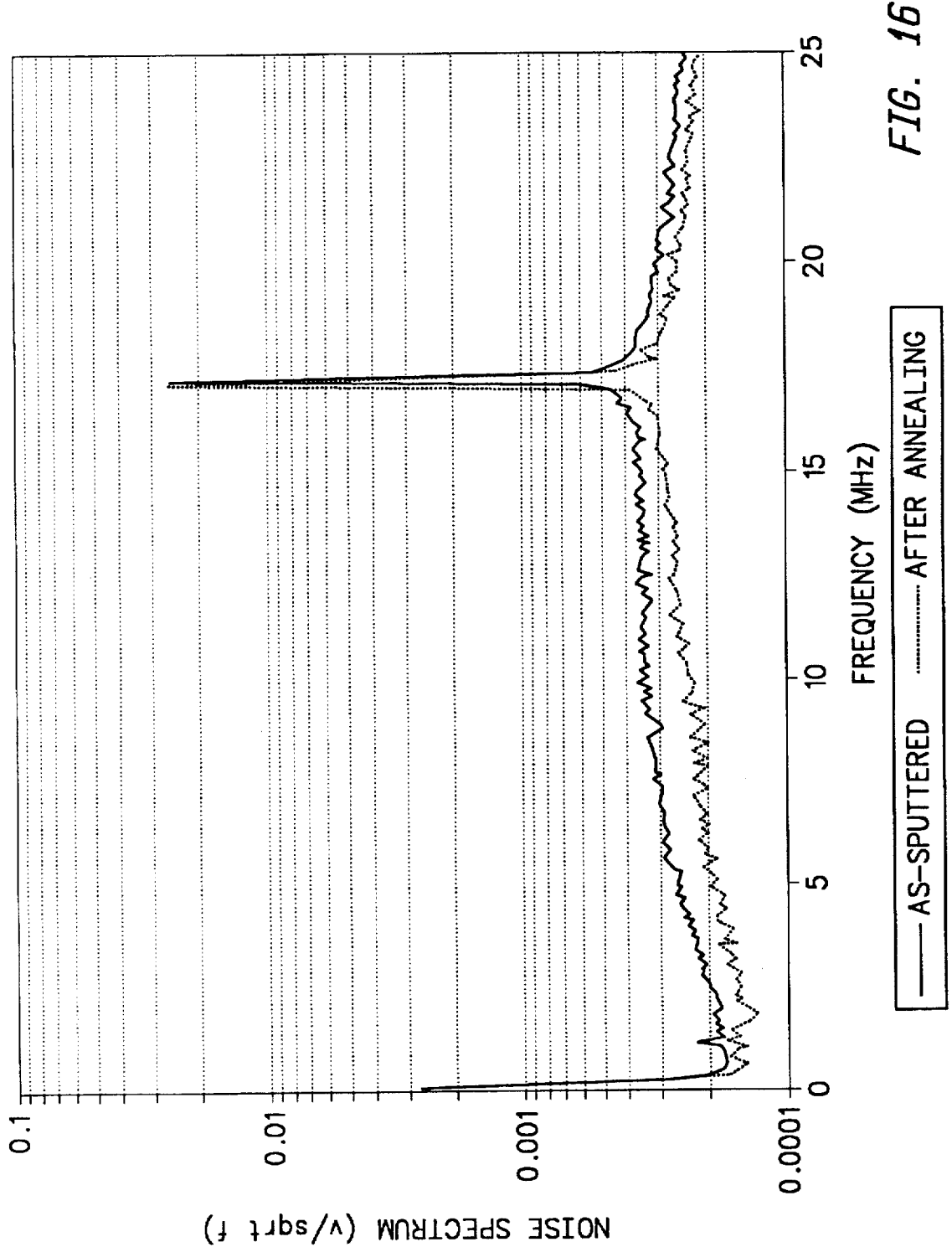
FIG. 16 is a plot showing a noise spectrum of a media prepared in accordance with the present invention demonstrating the noise of the media in volts/(frequency$^{1/2}$) [v/sqrt f] versus frequency in MHz. An as sputtered media (_) is compared to the same media following annealing in accordance with the invention ( . . . ).

An example of the effect of annealing the as sputtered media in accordance with the present invention is shown in FIG. 16. In FIG. 16, a plot is provided showing a noise spectrum of a media prepared in accordance with the present invention demonstrating the noise of the media in v/sqrt f versus frequency in MHz. An as sputtered media (__) is compared to the same media following annealing in accordance with the invention ( . . . ).

In the experiment, a multi-layer media was prepared in accordance with the present invention. The media contained a 300 Å palladium keeper layer and a 20 layer lattice of 3.5 Å cobalt and 10 Å palladium. Following sputtering of the media, a noise spectrum was obtained. Following the noise spectrum, the media was subjected to a controlled annealing at 260° C. for between about 10-20 minutes.

In the Figure, the noise spectrum of the as sputtered media is shown with the solid line (__) as compared to the noise spectrum of the media following annealing, which is shown with a dotted line ( . . . ). As will be observed, the signal output of the media did not change. However, the media noise was reduced. A 4.2 dBm increase in signal-to-noise ratio was observed.

Figure 17:
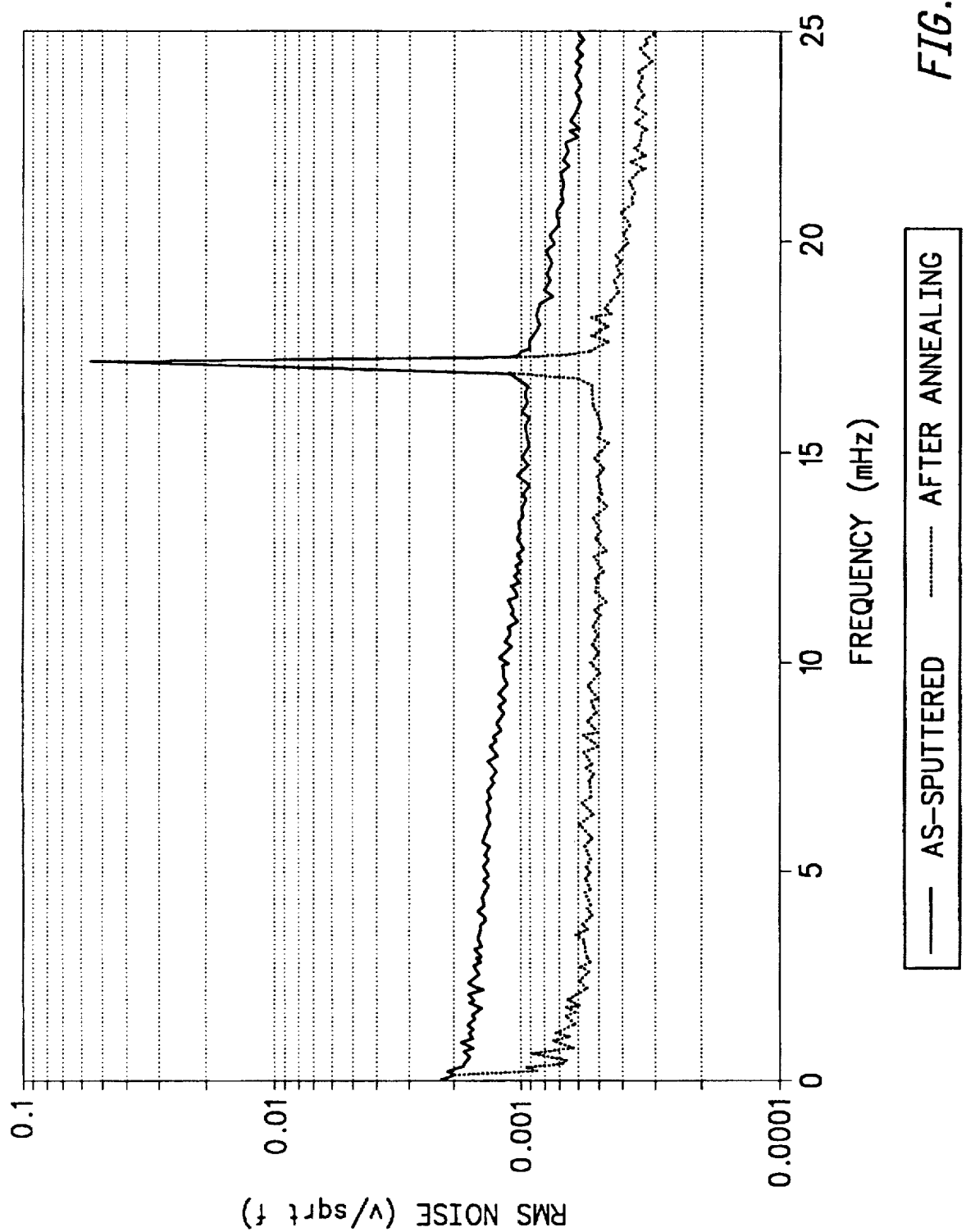
FIG. 17 is a plot showing a noise spectrum of a media prepared in accordance with the present invention demonstrating the noise of the media in v/sqrt f versus frequency in MHz. An as sputtered media including a keeper layer (_) is compared to the same media following annealing in accordance with the invention ( . . . ).

A similar experiment was also run in which the medium was prepared with a keeper layer. The results from such experiment are shown in FIG. 17. In FIG. 17, a plot is provided showing a noise spectrum of a media prepared in accordance with the present invention demonstrating the noise of the media in v/sqrt f versus frequency in MHz. An as sputtered media including a keeper layer (__) is compared to the same media following annealing in accordance with the invention ( . . . ).

In the experiment, a vertical recording medium was prepared in accordance with the present invention having an 6 μm NiFe keeper layer, onto which a 280 Å palladium nucleating layer was deposited. Upon the nucleating layer, a 20 layer lattice was deposited. The lattice included 3.5 Å cobalt layers and 10 Å palladium layers.

Following sputtering of the media, a noise spectrum was run on the media. The noise spectrum of the media is shown in the Figure with a heavy solid line (__). After the noise spectrum was obtained, the media was annealed in accordance with the present invention. Annealing was accomplished through baking the media at 260° C. for between 10 and 20 minutes. After annealing, a noise spectrum was run on the media. The results of the noise spectrum is shown in the Figure with a light solid line (__).

As will be observed, there was a significant reduction in the noise of the annealed media, as compared to the non-annealed media. Again, rather interestingly, the signal showed a slight increase. However, there was an big increase in the signal-to-noise ratio, about 7 dBm as shown in Table 1 in connection with Sample 7 and 8.

Pre-Annealing of Keeper Layer

We have also discovered that through pre-annealing the keeper layer, prior to deposition of the vertical recording media, there is a reduction in media noise. Intriguingly, the observed signal appears to increase where the keeper layer is annealed prior to sputtering of the vertical layer.

In one embodiment, annealing is accomplished through exposing the keeper layer under relatively moderate temperatures and for relatively short periods of time. For example, in certain embodiments, annealing is accomplished at a temperature of about 260° C. and for no more than about 30 minutes. In other embodiments, the layer films are annealed at a temperature of about 260° C. for about 10 to 20 minutes. Further, in other embodiments, the annealing step is conducted in the presence of air or oxygen.

Figure 18:
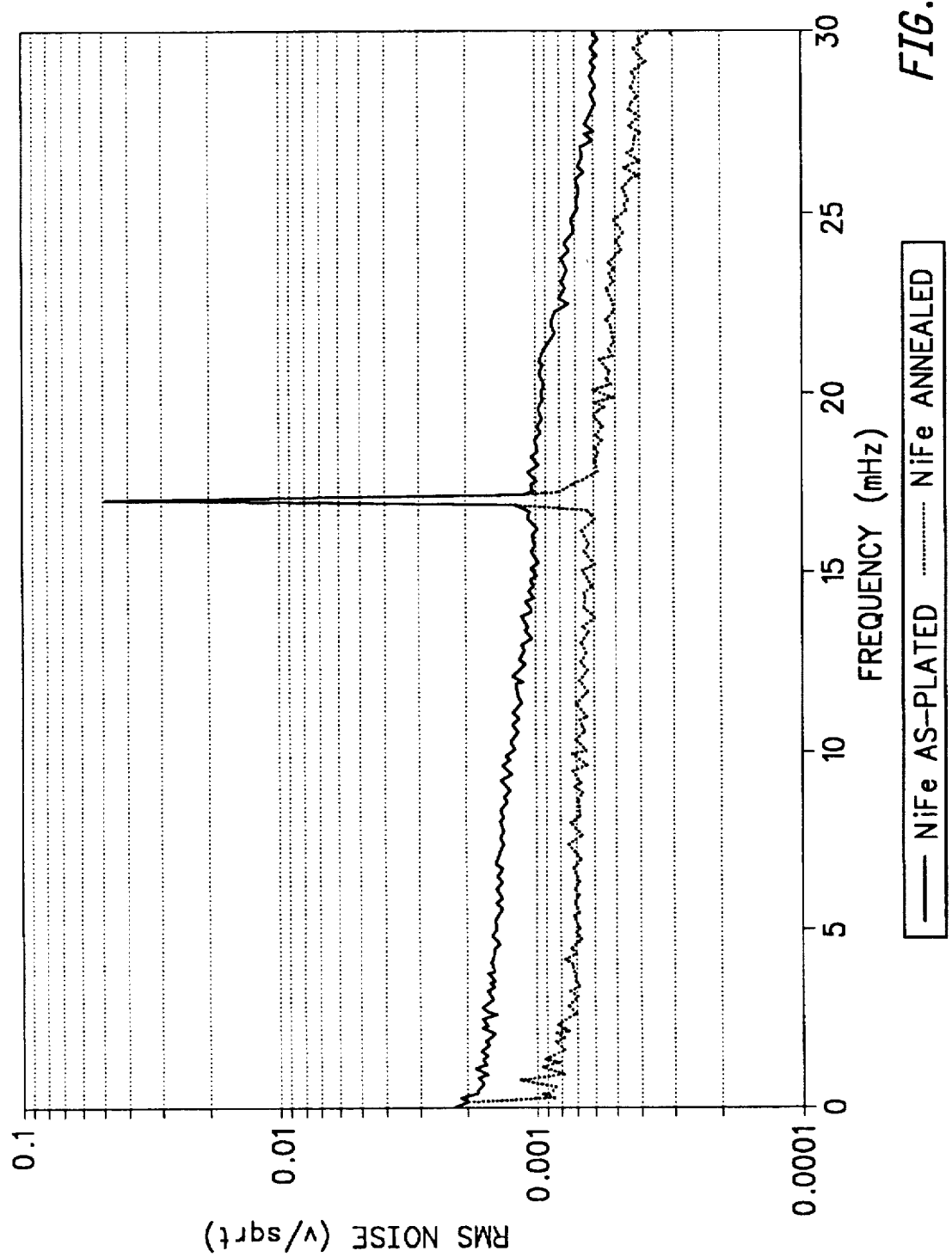
FIG. 18 is a plot showing a noise spectrum of a media prepared in accordance with the present invention demonstrating the noise of the media in v/sqrt versus frequency in MHz. A media prepared with a non-annealed keeper layer (_) is compared to a similar media in which the keeper was annealed in accordance with the invention ( . . . ).

An example of the effect of annealing the keeper layer in accordance with the present invention is shown in FIG. 18 and as shown in Table 1 and samples 7 and 9. In FIG. 18, a plot is provided showing a noise spectrum of a media prepared in accordance with the present invention demonstrating the noise of the media in v/sqrt versus frequency in MHz. A media prepared with a non-annealed keeper layer (__) is compared to a similar media in which the keeper was annealed in accordance with the invention ( . . . ).

In the experiment, two kinds of media were studied. One had an as-plated NiFe keeper layer and the other has an annealed NiFe keeper layer. Annealing was accomplished by heating the substrate with the as-plated NiFe containing substrate at about 260° C. for between about 10 and 20 minutes. Then, multi-layer media were prepared on both substrates in accordance with the present invention. The media contained a 280 Å palladium under layer and a 20 layer lattice of 3.5 Å cobalt and 10 Å palladium.

In the Figure, the noise spectrum of the media with the plated keeper layer is shown with the solid line (__) as compared to the noise spectrum of the annealed NiFe media, which is shown with a dotted line ( . . . ). As will be observed, the signal output of the media did not change. However, the media noise was reduced. A 6.5 dBm increase in signal-to-noise ratio was observed as shown in Table 1, Samples 7 and 9.

Doping of Vertical Cobalt Layer

We have also discovered that through forming an alloy of, and within, the vertical recording material, media noise can also be controlled. To this end, we prepared seven separate media in accordance with the present invention: (i) a non-keepered cobalt vertical media with no chromium, (ii) a non-keepered cobalt vertical media co-sputtered with 6% chromium, (iii) a non-keepered cobalt vertical media co-sputtered with 12% chromium , (iv) a keepered cobalt vertical media with no chromium, (v) a keepered cobalt vertical media co-sputtered with 6% chromium, (vi) a keepered cobalt vertical media co-sputtered with 12% chromium, and (vii) a keepered cobalt vertical media co-sputtered with 18% chromium.

Figure 19:
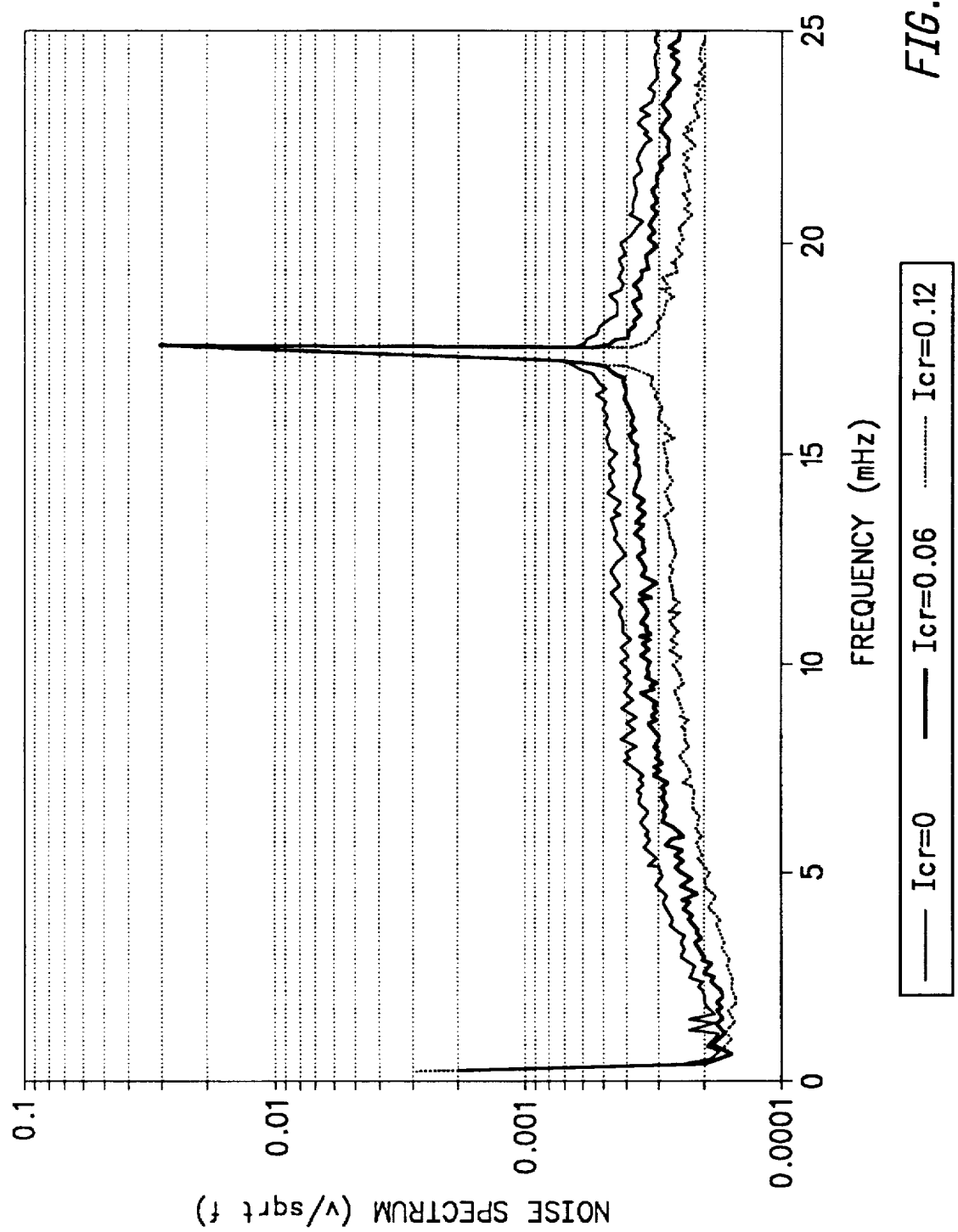
FIG. 19 is a plot of a noise spectra of non-keepered media prepared in accordance with the invention comparing noise in v/sqrt f versus frequency in MHz viewing the effects of doping with chromium.
Figure 20:
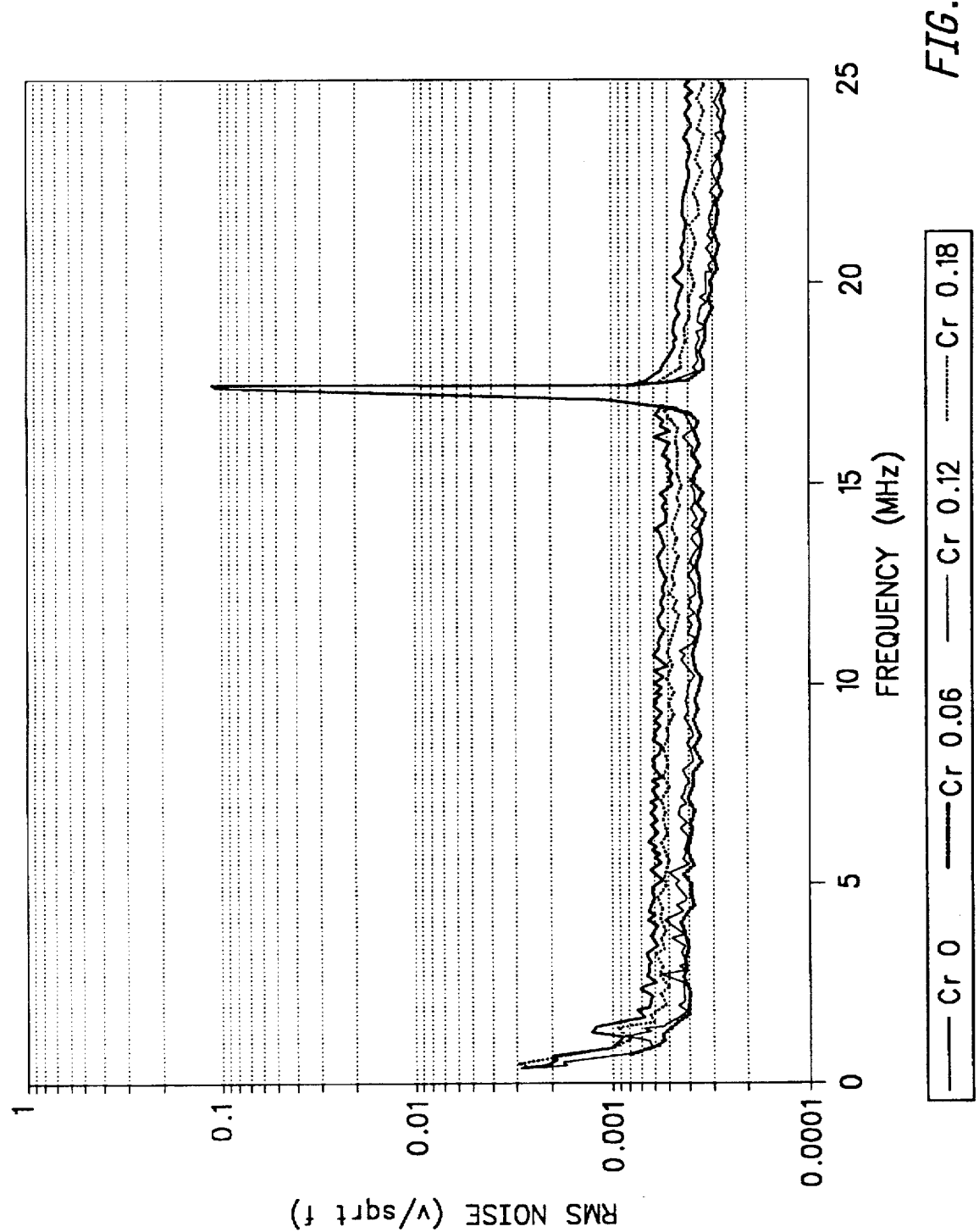
FIG. 20 is a plot of a noise spectra of keepered media prepared in accordance with the invention comparing noise in v/sqrt f versus frequency in MHz viewing the effects of doping with chromium.

The resulting noise spectra from such samples are shown in FIGS. 19 and 20, which are noise spectra of media prepared in accordance with the invention comparing noise in v/sqrt f versus frequency in MHz viewing the effects of doping with chromium. FIG. 19 demonstrates the results for non-keepered media (samples (i)-(iii)) and FIG. 20 demonstrates the results for keepered media (samples (iv)-(vii)).

As will be observed in connection with FIG. 19 and Table 2, below, as the concentration of chromium is increased, the signal output decreases slightly. However, media noise drops significantly. The signal-to-noise ratio rises up about 3.31 dBm. See also Table 1, Samples 4-6.

TABLE 2

| Cr (%) | Output (mv) | Noise (mv) | SNR (dBm) |
| --- | --- | --- | --- |
| 0 | 30.98 | 14.01 | 6.77 |
| 6 | 26.87 | 10.85 | 7.77 |
| 12 | 25.54 | 7.86 | 10.08 |

Referring now to FIG. 20 and Table 3, below, the results of alloy concentration for the keepered media in accordance with the invention is demonstrated. As will be observed, as chromium concentration increases, the signal is reduced slightly. At the same time, the noise in the media is also reduced. However, the linearity of the reduction of noise appears to end by the time that chromium content is pushed to 0.18 amps (i.e., 18%). The signal-to-noise ratio increases as chromium content is increased. See also Table 1, Samples 9-12.

TABLE 3

| Number of Layers | Chromium Content (Amps) | Output (mv) | Noise (mv) | SNR (dBm) |
| --- | --- | --- | --- | --- |
| 20 | 0 | 124.31 | 25.76 | 13.62 |
| 20 | 0.06 | 120 | 21.31 | 14.8 |
| 20 | 0.12 | 111.59 | 17.63 | 15.96 |
| 20 | 0.18 | 94.3 | 15.85 | 15.4 |

We also looked at the effects of utilizing cobalt-chromium-tantalum alloy in preparation of media in accordance with the invention as the thickness of the alloy is varied. The results are demonstrated in Table 4, below. As will be observed, the media noise for the samples is similar to the chromium doped samples discussed above, where the chromium content was based on 0.12 amps (i.e., 12%) of power to the chromium target. See also Table 1, Sample 12 and Table 1, Samples 18–20.

TABLE 4

| Sample | Underlayer Pd | Magnetic Layer Type (Å) | Pd (Å) | Layers | Hc (Oe) | Mrt (memu/cm$^2$) | 73.02 Kfci Output (mv) | SNR$_{Media}$ (dBm) | 123.57 Kfci Output (mv) | SNR$_{Media}$ (dBm) |
| --- | --- | --- | --- | --- | --- | --- | --- | --- | --- | --- |
| 1 | 280 Å | CoCrTa/3.5 Å | 10 | 20 | 968 | 1 | | | | |
| 2 | 280 Å | CoCrTa/3 Å | 10 | 20 | 1462 | 0.86 | | | | |
| 3 | 470 Å | CoCrTa/3 Å | 10 | 20 | 2015 | 0.85 | | | | |
| 4 | 470 Å | CoCrTa/3 Å | 10 | 20 | | | 90.09 | 17 | 40.95 | 9.15 |
| 5 | 280 Å | CoCr12/3.5 Å | 10 | 15 | | | 69.18 | 17.13 | 33.51 | 8.81 |

Adjusting Number of Layers in the Recording Layer

As discussed above, we also observed that the number of layers in the lattice may play a role in the noise of the media. This effect can be observed in Table 5, below. See also Table 1, Samples 11 and 14.

TABLE 5

| Number of Layers | Chromium Content (Amps) | Output (mv) | Noise (mv) | SNR (dBm) |
| --- | --- | --- | --- | --- |
| 20 | 0.12 | 111.59 | 17.63 | 15.96 |
| 15 | 0.12 | 90.43 | 11.56 | 17.71 |

Figure 21:
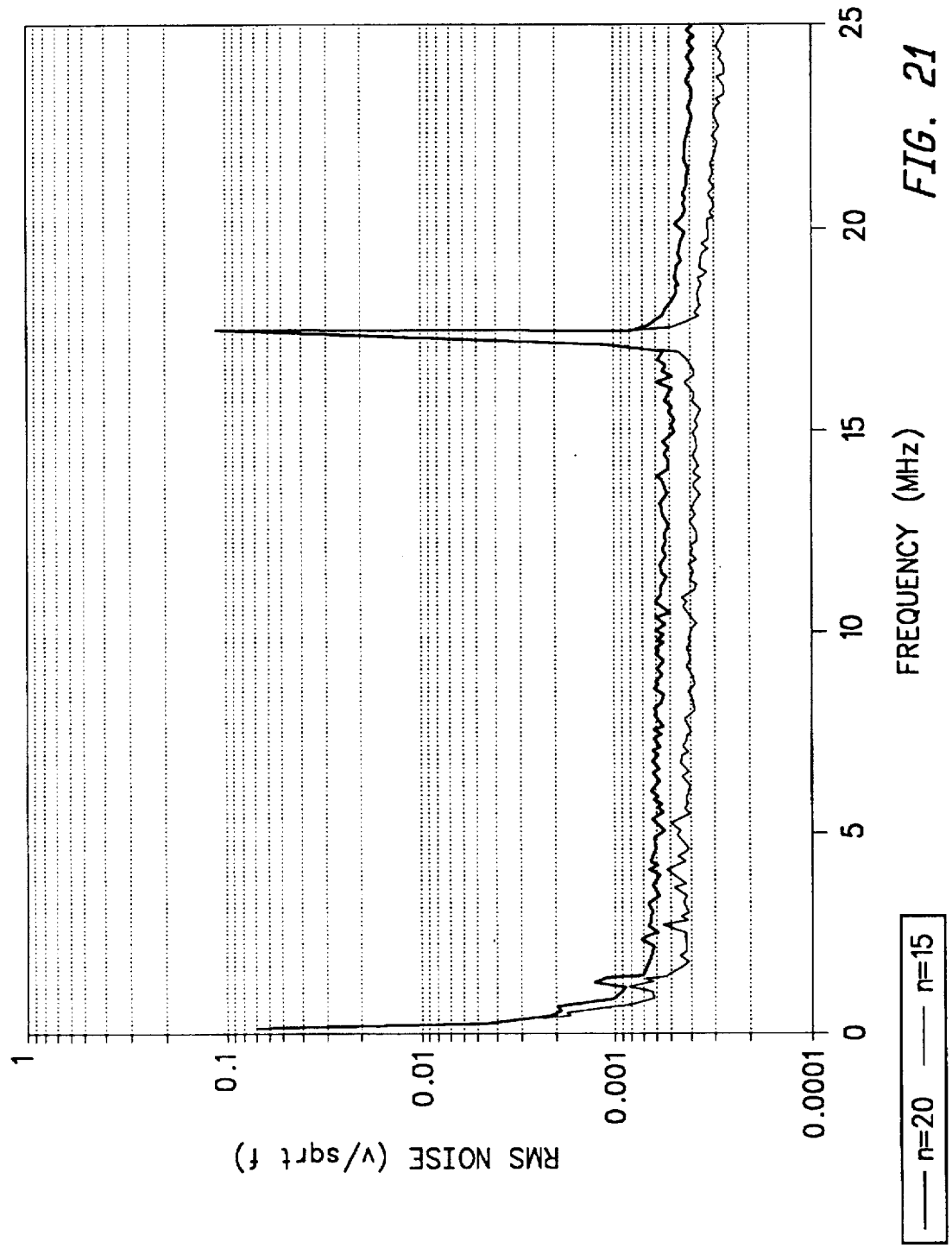
FIG. 21 is a plot of a noise spectra of media prepared in accordance with the invention comparing noise in v/sqrt f versus frequency in MHz viewing the effects of number of layers in the lattice.

As will be observed, while the noise is substantially reduced in the 15 layer media, the signal is also reduced. Therefore, the signal-to-noise ratio is enhanced. Nevertheless, it is probable that through fine tuning the media of the invention, it will be possible to select a slightly smaller number of layers in the lattice than 20 layers without reduction in signal. This will allow us to better control the media noise. In FIG. 21 a plot of a noise spectra of media prepared in accordance with the invention comparing noise in v/sqrt f versus frequency in MHz viewing the effects of number of layers in the lattice is provided.

Sputtering Recording Layer in Presence of Oxygen

We also discovered that media noise may be reduced through sputtering of the lattice in the presence of small quantities of oxygen. While not wishing to bound by any particular theory or mode of operation of this process, as mentioned above in connection with annealing, it is expected that the oxygen facilitates the reorientation of crystals within the recording media. In addition, it is also possible that there is some formation of oxides within the crystal lattice of the recording media. It is also possible to make targets with cobalt oxides for noise reduction if RF sputtering is used.

Figure 22:
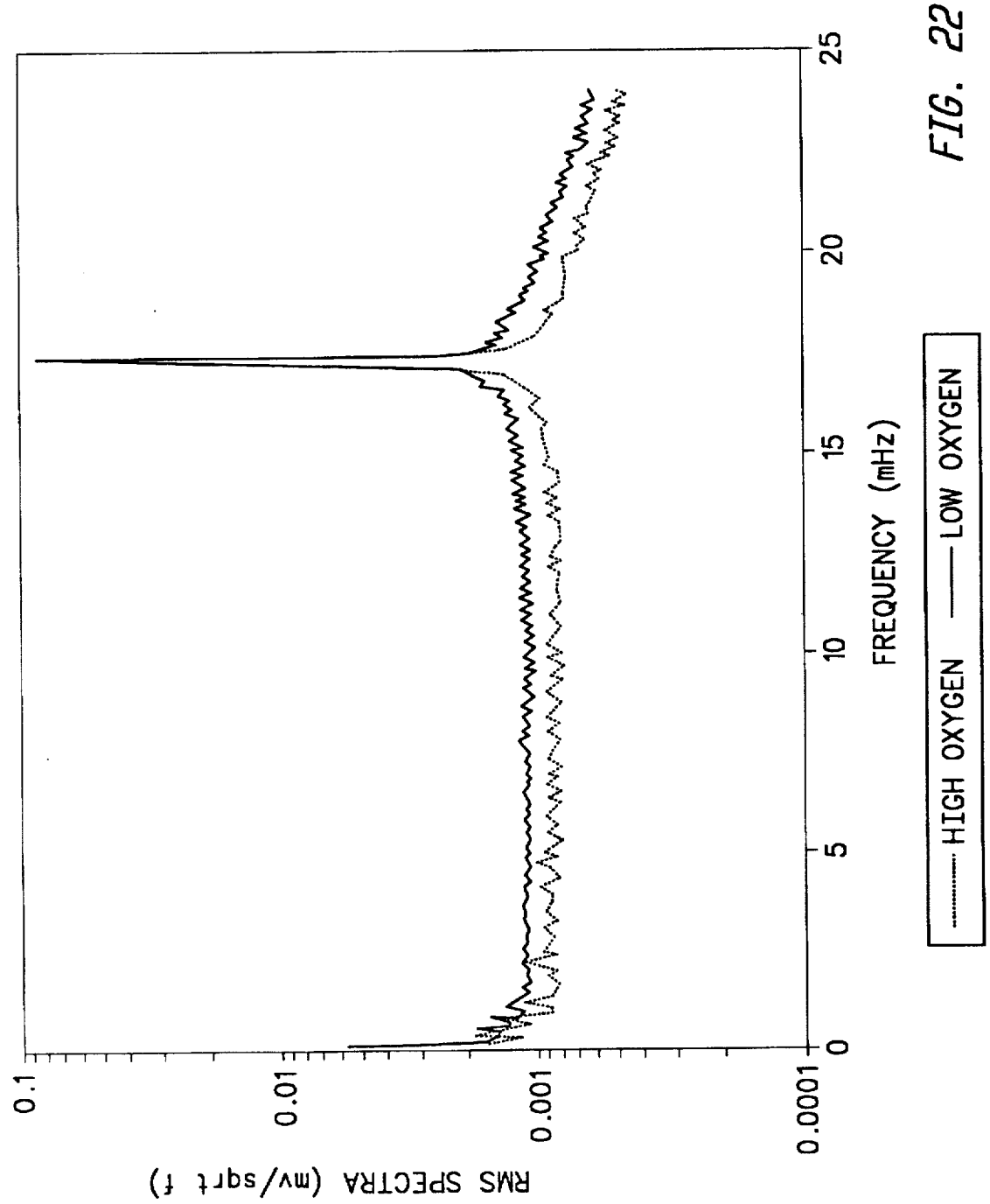
FIG. 22 is a plot of a noise spectra of media prepared in accordance with the invention comparing noise in v/sqrt f versus frequency in MHz viewing the effects of sputtering the lattice in the presence of oxygen.

The effect of sputtering the lattice in the presence of oxygen is shown in FIG. 22, which is a plot of a noise spectra of media prepared in accordance with the invention comparing noise in v/sqrt f versus frequency in MHz viewing the effects of sputtering the lattice with oxygen. The oxygen is adjusted by changing the base pressure. In certain embodiments, the amount of oxygen used is between about 0.05 and 0.5% (v/v).

Physical Offset of MR Element in a MR Read Head

In addition to the above-discussed strategies for controlling media noise, we have additionally discovered that the media in accordance with the invention is read very effectively with an MR read head. In view of this finding, we have designed an MR head with a physical offset (i.e., tilted relative to the vertical flux in the media) in order to reduce the apparent media noise. Such head is illustrated in FIG. 23 which is a side cross-sectional schematic view of an MR head with a physical offset in accordance with the present invention.

As used herein MR refers to both anisotropic magnetoresistive effect (AMR) and giant magnetoresistive effect (GMR). A variety of AMR and GMR senors and materials and sensors are well known in the art. For example, AMR sensors are typically formed from NiFe materials (i.e., permalloy), configured into a Wheatstone bridge configuration on a substrate. GMR sensors are typically formed from multilayer films of alternating magnetic (i.e., Fe, Co, Ni, or alloys thereof) and nonmagnetic materials (i.e., Cr, Ru, Cu, Al, Ag, Au, or alloys thereof), generally formed into a wheatstone bridge configuration on a substrate. In accordance with the invention, either AMR or GMR type sensors may be used.

In the Figure, a vertical recording media 60, in accordance with the invention, having a recording layer 61 and a keeper layer 62, is shown in combination with a head depicted by a ring write element 63 and an MR strip read element 64. The ring write element 63 generally includes a first flux arm 65, a second flux arm 66, and a gap 67. The ring write element 63 is utilized to produce flux 68 across the gap 67. Flux may be introduced through either the first arm 65 or the second arm 66, depending on the desired direction of the flux in the media 60. The flux 68 creates areas of differential flux density 69 (arrows) within the media 60. Such fluxes 69, surprisingly, when utilizing a ring write element 63 align, generally, vertical up 70 or vertical down 71, with transition areas 72, therebetween.

As the media 60 passes under the MR element 64, the MR element 64 will change in resistance in regions where the flux within the media 60 is perpendicular (i.e., points 70 and 71) and signals will be in response to the vertically aligned flux in the media.

The MR element 64 is shielded from the write head 63 by shields 74a and 74b, and the MR element 64 is disposed between the shields 74a and 74b. In the Figure, the Mr element 64 is offset at an angle 75 (θ) relative to an imaginary line 76 extending perpendicular into the media 60.

The angle 75 (θ) is between about −20° to about 20°, or between about −15° to about 15°, and in certain embodiments, between about −10° to about 10°.

Figure 23A:
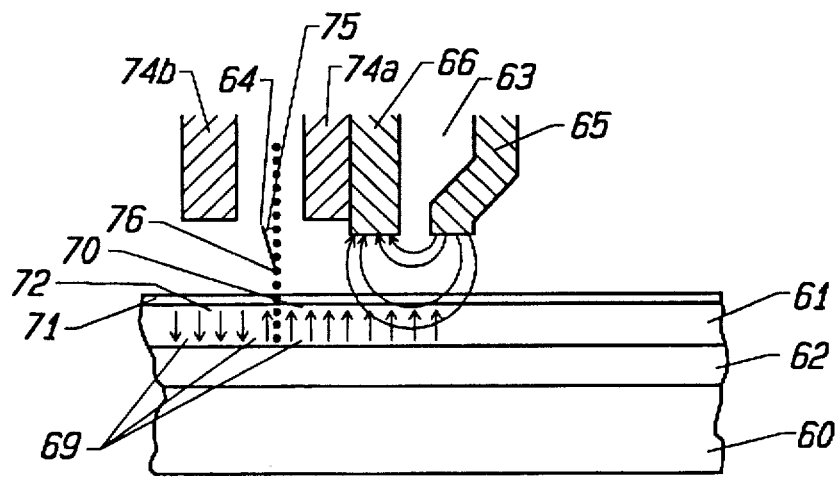
FIG. 23A is a side cross-sectional schematic view of an MR head having an MR element with a physical offset in accordance with the present invention.
Figures 23B, 23C:
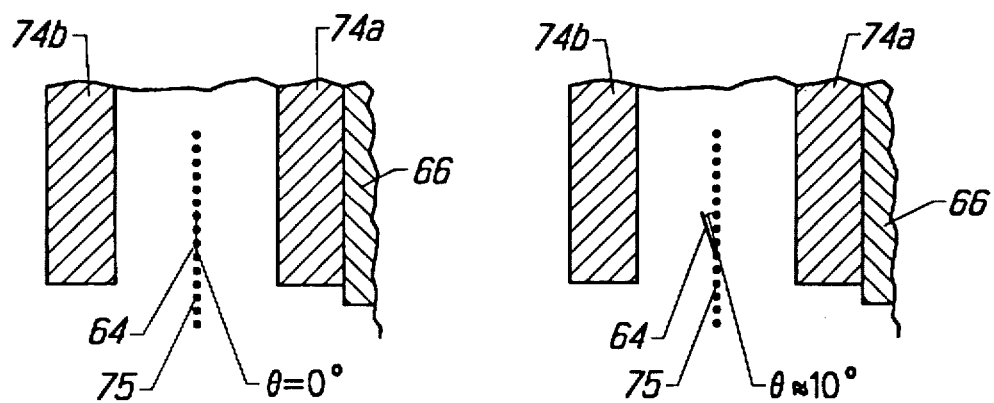
FIGS. 23B and 23C are enlarged views of the orientation of the MR element in FIG. 23A.

In FIGS. 23a and 23b, enlarged views of the MR read element shown in FIG. 23 are shown. In FIG. 23a, the MR read element 64 is shown without a physical offset or where angle 75 (θ) is zero degrees. In FIG. 23b, the MR read element 64 is shown with a physical offset or where angle 75 (θ) is approximately 10 degrees.

In operation, the angle 75 of the MR element 64 acts to provide a physical offset. The angle 75, essentially, acts to slightly reduce the sensitivity of the MR element 64 to flux 69 in the media that is vertical up 70 or vertical down 71. It is expected that each particle in the media possesses varying flux densities that will depend, at least, on particle size and particle orientation. Thus, through slightly reducing the sensitivity of the MR element 64 to such variations in flux density, it is expected that media noise will be reduced.

It will be appreciated that a similar effect could be achieved through growing the crystals in the lattice with a similar, slight, physical offset. For example, the texture of the substrate can be varied so as to cause an angled-type crystal growth. In addition, it is also possible to create an angled charge during the sputtering process between the substrate and the targets.

Combination approaches could be also be used. For example, crystal growth could be physically offset to one side of perpendicular while the MR element 64 could be offset in the opposite direction. Such approach could be used to significantly reduce media noise.

Disk Drive Systems Incorporating Media in Accordance with the Invention and Ring Write/MR Read Head In accordance with the invention, there is provided a disk drive system incorporating media in accordance with the invention and a ring write/MR read head. The operation of the system is better understood in connection with a discussion of prior art systems for recording and reading information. In general, the prior art systems may be classified according to longitudinal and vertical media and the type of head utilized for recording and reading.

Thus, in FIG. 24 there is provided a comparison of recording/reading strategies with various recording media. FIG. 24a is an example of a conventional strategy of recording/reading on longitudinal recording medium utilizing a ring write head and an MR strip read head. FIG. 24b is an example of a conventional strategy of recording/reading on vertical recording medium utilizing a single pole read and write head. FIG. 24c is an example the strategy for reading and writing on the vertical recording medium in accordance with the present invention utilizing a ring write head and an MR strip read head.

In FIG. 24a, a longitudinal recording media 38 is shown in combination with a head depicted by a ring write element 39 and an MR strip read element 40. The ring write element 39 generally includes an upper or first pole 41, a second pole 42, and a gap 43. The ring write element 39 is utilzed to produce flux 44 across the gap 43. The flux 44 creates areas of differential flux density 45 (arrows) within the media 38. As will be appreciated, the flux parallel to the surface of the media are generally the information containing flux differentials utilized to store information within longitudinal media. Such fluxes 45, when utilizing a ring write element 39 align, generally, parallel right 46, vertical up 47a, vertical down 47b, or parallel left 48.

As the media 38 passes under the MR element 40, the MR element 40 will change in resistance in regions where the flux within the media 38 is perpendicular (i.e., points 47a and 47b) and signals will be produced, as shown by output 49.

In FIG. 24b, the conventional system for reading and writing to vertical media is shown. There, a vertical recording media 50, having a recording layer 51 and a keeper layer 52, is shown. A single pole read and write head 53 is used to generate flux 54 to the media 50. The flux 54, typically, is returned through the media 50, for example, through the keeper layer 52. The flux 54 creates areas of differential flux density 55 (arrows) within the media 50. Such flux 55, when utilizing the pole head 53 align, generally, vertical up 56 or vertical down 57, with transition areas 58, therebetween. When the pole head 53 is not writing, it is sensitive to flux from the media that is perpendicular to the media 50.

As the media 50 passes under the read head 53, the read head 53 detects the areas of vertical flux (i.e., points 56 and 57) and produces an output as in output 58.

Finally, in FIG. 24c, a vertical recording media 60, in accordance with the invention, having a recording layer 61 and a keeper layer 62, is shown in combination with a head depicted by a ring write element 63 and an MR strip read element 64. The ring write element 63 generally includes a first and pole 65, a second pole 66, and a gap 67. The flux 68 creates areas of differential flux density 69 (arrows) within the media 60. Such fluxes 69, surprisingly, when utilizing a ring write element 63 align, generally, vertical up 70 or vertical down 71, with transition areas 72, therebetween.

As the media 60 passes under the MR element 64, the MR element 64 will change in resistance in regions where the flux within the media 60 is perpendicular (i.e., points 70 and 71) and signals will be produced, as shown by output 73.

A surprising feature of a disk drive utilizing the media of the present invention and a ring write/MR read head as discussed above that the media of the invention is easily magnetized, in a vertical orientation, with the ring write head. Conventionally, ring write heads have been used for longitudinal media. The ability to utilize a ring write head in accordance with the invention marks a significant advantage. Such heads are easily and inexpensively built. Further, ring write heads do not rely on the media for flux return, as is required by a single pole write head.

FIG. 25 is a top perspective view of a disk drive assembled with media in accordance with the invention. The disk drive 77 includes a hard disk assembly comprised of a base 78 and cover 79 which engage to form a housing 80. The housing 80 houses a disk storage medium 81 and an actuator assembly 82. Disk storage medium 81 includes an upper surface 82 and a lower surface (not shown). Also provided is a control means 83 comprising a printed circuit board 84 having a plurality of integrated circuit components thereon which are utilized to control data storage operations in drive 77. A header assembly 85 is included to transfer control signals from printed circuit board 84 to the housing 80.

As shown in FIG. 26, which is an exploded view of the disk drive 77 as shown in FIG. 25, a spin motor 86 is mounted in base 78 and supports disk storage medium 81 for rotation about an axis passing through the approximate center of disk 81 in a plane perpendicular thereto. Actuator assembly 82 includes an actuator arm 87 for mounting at least one interactive element 88 in a position adjacent to the surface of disk 81. As will be generally understood by those skilled in the art, at least two interactive elements 88, such as magnetic read and write heads, are generally provided, one for each surface of disk storage medium 81.

While the invention has been described in connection with specific embodiments, it will be understood that the invention is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What we claim is:

1. A magnetic recording medium, comprising:

a substrate having deposited thereon a nucleating layer of a nonmagnetic metal selected from the group consisting of palladium or platinum having a thickness of greater than 50 Å and a recording layer comprising a plurality of bilayers of a magnetic metal, or an alloy thereof, having perpendicular magnetic anisotropy and having a first thickness and a nonmagnetic metal selected from the group consisting of palladium or platinum having a second thickness, and a keeper layer having a third thickness, said keeper layer disposed between said nucleating layer and said substrate, wherein the thickness of the nucleating layer, the first thickness, the second thickness, and the number of bilayers are selected such that the medium possesses a coercivity of greater than about 1000 Oe, a signal output of greater than 54 mv, a signal noise level of less than 44 mv, and a signal to noise ratio of greater than 7 dBm.

2. The medium of claim 1, wherein the first thickness is between about 1.5 Å and 10 Å.

3. The medium of claim 1, wherein the first thickness is between about 2 Å and 7 Å.

4. The medium of claim 1, wherein the first thickness is between about 3 Å and 5 Å.

5. The medium of claim 1, wherein the magnetic layers comprise cobalt.

6. The medium of claim 5, wherein the first thickness is between about 1.5 Å and 10 Å.

7. The medium of claim 5, wherein the first thickness is between about 2 Å and 7 Å.

8. The medium of claim 5, wherein the first thickness is between about 3 Å and 5 Å.

9. The medium of claim 1, wherein the second thickness is between about 5 Å and 15 Å.

10. The medium of claim 1, wherein the second thickness is between about 7 Å and 12 Å.

11. The medium of claim 1, wherein the second thickness is between about 8 Å and 11 Å.

12. The medium of claim 1, wherein the thickness of the nucleating layer is between about 200 Å and about 600 Å.

13. The medium of claim 1, wherein the number of bilayers is between about 10 and 30.

14. The medium of claim 1, wherein the number of bilayers is between about 15 and 25.

15. The medium of claim 1, wherein the nucleating layer and the recording layer have a total thickness that does not exceed 1500 Å.

16. The medium of claim 1, wherein the medium has a coercivity that exceeds about 2500 Oersteds.

17. The medium of claim 1 wherein the keeper layer is formed from an NiFe alloy.

18. The medium of claim 1 wherein the keeper layer has a thickness of between about 2 μm and about 6 μm.

19. A magnetic recording medium, comprising:

a substrate having deposited thereon a nucleating layer of a nonmagnetic metal selected from the group consisting of palladium or platinum having a thickness of greater than 50 Å, a keeper layer disposed between said nucleating layer and said substrate, and a recording layer comprising a plurality of bilayers of cobalt, or an alloy thereof, having a first thickness and a nonmagnetic metal selected from the group consisting of palladium or platinum having a second thickness, characterized in that the first thickness is between about 1.5 Å and 10 Å, the second thickness is between about 5 Å and 15 Å, the number of bilayers is between about 10 and 30, a thickness of the nucleating layer, the keeper layer and the recording layer does not exceed 1500 Å, and a coercivity of the medium that exceeds about 2500 Oersteds, and further characterized in that the thickness of the nucleating layer, the first thickness, the second thickness, and the number of bilayers are selected such that the medium possesses a signal output of greater than 54 mv, a signal noise level of less than 44 mv, and a signal to noise ratio of greater than 7 dBm.

20. The medium of claim 19, wherein the first thickness is between about 2 Å and 7 Å.

21. The medium of claim 19, wherein the first thickness is between about 3 Å and 5 Å.

22. The medium of claim 19, wherein the second thickness is between about 7 Å and 12 Å.

23. The medium of claim 19, wherein the second thickness is between about 8 Å and 11 Å.

24. The medium of claim 19, wherein the thickness of the nucleating layer is between about 200 Å and about 600 Å.

25. The medium of claim 19, wherein the number of bilayers is between about 15 and 25.

26. The medium of claim 19 wherein the keeper layer is formed from an NiFe alloy.

27. The medium of claim 19 wherein the keeper layer has a thickness of between about 2 μm and about 6 μm.

* * * * *